(12) United States Patent
Tang et al.

(10) Patent No.: US 11,302,026 B2
(45) Date of Patent: Apr. 12, 2022

(54) ATTITUDE RECOGNITION METHOD AND DEVICE, AND MOVABLE PLATFORM

(71) Applicant: SZ DJI TECHNOLOGY CO., LTD., Shenzhen (CN)

(72) Inventors: Ketan Tang, Shenzhen (CN); You Zhou, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 98 days.

(21) Appl. No.: 16/719,324

(22) Filed: Dec. 18, 2019

(65) Prior Publication Data
US 2020/0126249 A1 Apr. 23, 2020

Related U.S. Application Data

(63) Continuation of application No. PCT/CN2017/092276, filed on Jul. 7, 2017.

(51) Int. Cl.
G06T 7/00 (2017.01)
G06T 7/70 (2017.01)
G06T 7/579 (2017.01)
G06T 7/254 (2017.01)
B64C 39/02 (2006.01)

(52) U.S. Cl.
CPC ............ *G06T 7/70* (2017.01); *B64C 39/024* (2013.01); *G06T 7/0002* (2013.01); *G06T 7/254* (2017.01); *G06T 7/579* (2017.01); *B64C 2201/127* (2013.01); *G06T 2207/10028* (2013.01); *G06T 2207/20224* (2013.01); *G06T 2207/30196* (2013.01)

(58) Field of Classification Search
None
See application file for complete search history.

(56) References Cited

U.S. PATENT DOCUMENTS

| 2003/0156756 | A1 | 8/2003 | Gokturk et al. |
| 2009/0077504 | A1* | 3/2009 | Bell ............... G06F 3/04812 715/863 |

(Continued)

FOREIGN PATENT DOCUMENTS

| CN | 102982557 A * | 3/2013 |
| CN | 102982557 A | 3/2013 |

(Continued)

OTHER PUBLICATIONS

Meihua Li, 3D Human Motion Tracking, Masteral Dissertation, Dalian University of Technology, Mar. 2004.

(Continued)

*Primary Examiner* — Delomia L Gilliard
(74) *Attorney, Agent, or Firm* — Anova Law Group, PLLC

(57) ABSTRACT

A method for recognizing a posture includes acquiring a depth image of a scene, and obtaining point clouds of an operator based on the depth image of the scene. The method also includes separating point clouds of an arm from the point clouds of the operator and obtaining a characteristic point from the point clouds of the arm. The method further includes determining a location relationship between the characteristic point and the operator and determining a posture of the operator based on the location relationship.

20 Claims, 16 Drawing Sheets

(56) References Cited

U.S. PATENT DOCUMENTS

| | | | | |
|---|---|---|---|---|
| 2013/0236089 A1* | 9/2013 | Litvak | ............... | G06K 9/00201 |
| | | | | 382/154 |
| 2015/0117708 A1* | 4/2015 | Guigues | .................. | G06T 7/246 |
| | | | | 382/103 |
| 2020/0193614 A1* | 6/2020 | Tadi | ........................ | G06N 5/003 |
| 2020/0301513 A1* | 9/2020 | Mejia Cobo | ............ | G06F 3/005 |

FOREIGN PATENT DOCUMENTS

| | | | | |
|---|---|---|---|---|
| CN | 103038727 | A | | 4/2013 |
| CN | 104115192 | A | | 10/2014 |
| CN | 105807926 | A | * | 7/2016 |
| CN | 105807926 | A | | 7/2016 |
| CN | 106843489 | A | | 6/2017 |
| EP | 0587138 | A2 | | 3/1994 |

OTHER PUBLICATIONS

The World Intellectual Property Organization (WIPO) International Search Report for PCT/CN2017/092276 dated Mar. 27, 2018 8 pages.

* cited by examiner

ATTITUDE RECOGNITION METHOD AND DEVICE, AND MOVABLE PLATFORM

CROSS-REFERENCE TO RELATED APPLICATION

This application is a continuation application of International Application No. PCT/CN2017/092276, filed on Jul. 7, 2017, the entire contents of which are incorporated herein by reference.

TECHNICAL FIELD

The present disclosure relates to the technology field of aerial photography and, more particularly, to posture recognition (attitude recognition).

BACKGROUND

Current methods for controlling an unmanned aerial vehicle ("UAV") primarily use cell phones or professional remote controllers, or other external devices to connect with the UAV, and control the UAV through commands. The operations are generally complex, which require a learning process. This type of interaction method is not intuitive, and user experience is not natural.

Another method for controlling the UAV is through hand gesture. However, current hand gesture recognition methods are not precise. Controlling the UAV through hand gestures tend to lose tracking of the target. User experience is also not good.

SUMMARY

In accordance with an aspect of the present disclosure, recognizing a posture. The method includes acquiring a depth image of a scene, and obtaining point clouds of an operator based on the depth image of the scene. The method also includes separating point clouds of an arm from the point clouds of the operator and obtaining a characteristic point from the point clouds of the arm. The method further includes determining a location relationship between the characteristic point and the operator and determining a posture of the operator based on the location relationship.

In accordance with another aspect of the present disclosure, there is also provided a method for controlling a movable platform. The method includes acquiring at least two depth images of a scene. The method also includes simulating, based on the at least two depth images of the scene, depth images of the scene at times other than times at which the at least two depth images of the scene are acquired. The method also includes recognizing a target object from the acquired depth images of the scene and the simulated depth images of the scene. The method further includes calculating a location change of the target object in the at least two acquired depth images and the simulated depth images, and controlling the movable platform to move based on the location change.

In accordance with another aspect of the present disclosure, there is also provided a method for recognizing an action. The method includes acquiring at least two depth images of a scene, and detecting locations of a target object in each of the depth images of the scene. The method also includes calculating a moving distance and a moving direction of the target object based on times at which the depth images of the scene are acquired and the locations of the target object in the depth images. The moving direction includes a first direction and a second direction. The method further includes determining an action of the target object is a swaying action based on a detection, within a predetermined time, that a number of movements in the first moving direction is not smaller than a first predetermined value, a number of movements in the second direction is not smaller than a second predetermined value, and the moving distance is not smaller than a predetermined distance.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

DETAILED DESCRIPTION OF THE EMBODIMENTS

Figure 1:
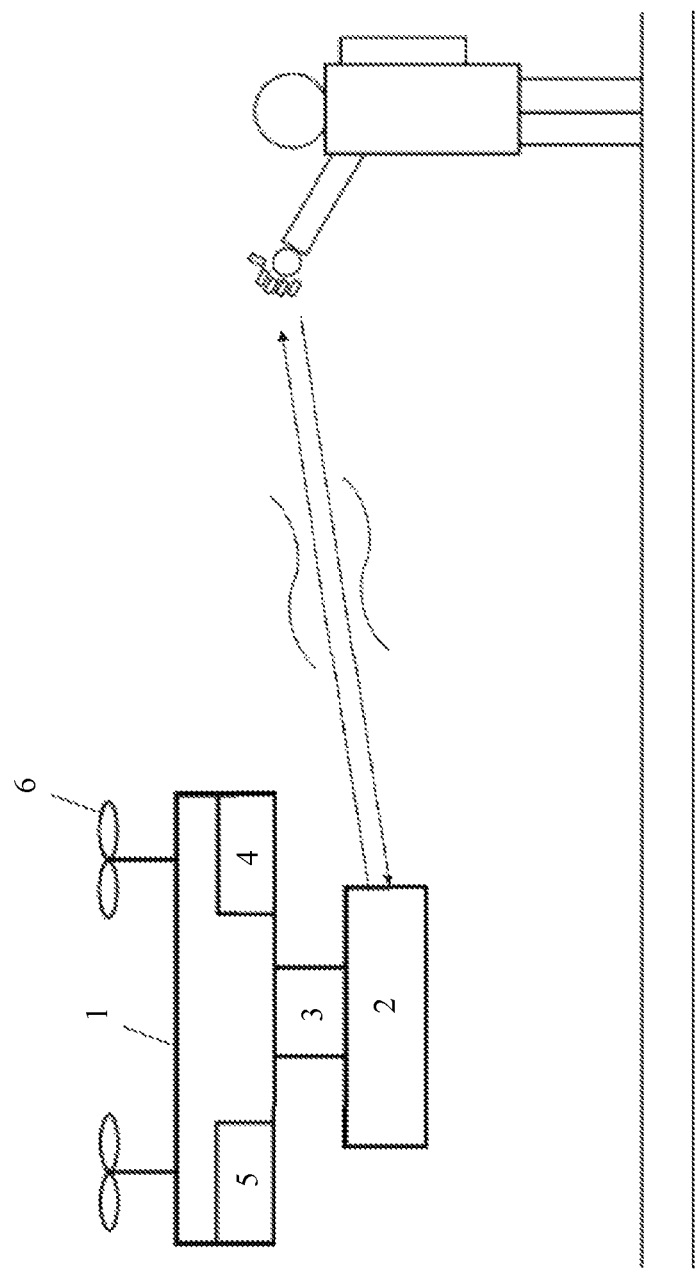
FIG. 1 is a schematic diagram of a posture recognition system, according to an example embodiment.

Technical solutions of the present disclosure will be described in detail with reference to the drawings, in which the same numbers refer to the same or similar elements unless otherwise specified. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

In addition, the singular forms "a," "an," and "the" are intended to include the plural forms as well, unless the context indicates otherwise. The terms "comprise," "comprising," "include," and the like specify the presence of stated features, steps, operations, elements, and/or components but do not preclude the presence or addition of one or more other features, steps, operations, elements, components, and/or groups. The term "and/or" used herein includes any suitable combination of one or more related items listed. For example, A and/or B can mean A only, A and B, and B only. The symbol "/" means "or" between the related items separated by the symbol. The phrase "at least one of" A, B, or C encompasses all combinations of A, B, and C, such as A only, B only, C only, A and B, B and C, A and C, and A, B, and C. In this regard, A and/or B can mean at least one of A or B. The term "within" when used in comparing a parameter A and a parameter B, may indicate that A (or B) is smaller (or less, fewer, lower, slower, shorter, etc.) than B (or A).

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

The following embodiments do not limit the sequence of execution of the steps included in the disclosed methods. The sequence of the steps may be any suitable sequence, and certain steps may be repeated.

FIG. 1 is a schematic illustration of a posture recognition system. As shown in FIG. 1, the system may include a movable platform 1, an acquisition device 2, a first processor 4, and a second processor 5.

The movable platform may include a UAV, an unmanned ground vehicle, or a robot, etc. In the following descriptions, the UAV is used as an example of the movable platform. In some embodiments, the movable platform 1 may include the acquisition device 2, the first processor 4, and the second processor 5. The first processor 4 and the second processor 5 may be the same single processor, or may be different processors. For example, the first processor 4 may be an image processor, and the second processor 5 may be a flight controller. The acquisition device 2 may include a control device, a transmitting device, and a receiving device. The controlling member may be configured to control the transmitting device to transmit signals. The controlling member may also be configured to adjust status information such as a frequency, and a duty cycle. The transmitting device may be configured to transmit an electromagnetic signal, and may include at least one of a light-emitting diode, a laser diode, etc. The electromagnetic signal may be reflected by an operator of the UAV. The receiving device may receive the reflected electromagnetic signal. In some embodiments, the receiving device may include at least one of a light-emitting diode, an electrically coupled component, etc. The receiving device may be configured to process the signals, such as amplifying the signals, filtering the signals, etc. The receiving device may transmit the signal to the first processor 4. The first processor 4 may convert the signal to a depth image. Converting the signal to the depth image may include directing converting the signal to the depth image, or obtaining the depth image through computation based on at least two photos. The depth image may include location information of the operator of the UAV and depth information. The first processor 4 may recognize the posture of the operator based on the depth information and the location information of the operator. The acquisition device 2 may include at least one of a time-of-flight ("TOF") camera, a laser scanner, etc. In some embodiments, the acquisition device 2 may also include at least one of monocular camera that can generate a three-dimensional vision based on multiple times of photographing, or a binocular camera, etc. The TOF is used as an example of the acquisition device 2 in the following descriptions. The movable platform 1 may include a gimbal 3 configured to reduce the vibration of the acquisition device 2. The recognized posture of the operator may be transmitted to the second processor 5. The second processor 5 may generate a control command for controlling the movable platform 1 based on the received posture of the operator, thereby controlling the movable platform 1 to move. In some embodiments, the second processor 5 may be configured to control a propulsion device 6 of the movable platform 1 to control the movable platform 1 to move.

TOF camera calibration relates coordinates in an image coordinate system in the depth image with coordinates of a camera coordinate system. The image coordinate system is a two-dimensional coordinate system. The camera coordinate system is a three-dimensional coordinate system. With the depth information obtained by the TOF camera, the two-dimensional image coordinates in each image coordinate system may be related with the three-dimensional coordinates in the camera coordinate system, i.e., three-dimensional point clouds in the camera coordinate system, which may be referred as point clouds for simplicity. The purpose of TOF camera calibration is to ensure consistency between the relationship between the relative locations of various portions of the point clouds and the real-world relationship, i.e., the conversion between the camera coordinate system and the global coordinate system. The global coordinate system means describing locations of the camera and the object based on a reference coordinate system selected from the environment. The reference coordinate system is the global coordinate system. The imaging principle of the TOF camera is the same as that of a pinhole camera, except that a receiver of the TOF camera can only receive a modulated infrared light reflected by a target object. An amplitude image obtained by the TOF camera is the same as a gray scale image obtained by an ordinary camera. The calibration method used by the TOF camera may also be similar to the calibration method used in an ordinary camera. For any given coordinates (u, v) in a two-dimensional image in the image coordinate system, assuming the corresponding coordinates are (X, Y, Z) in the global coordinate system, then $$\begin{bmatrix} u \\ v \\ 1 \end{bmatrix} = \alpha K \left( R \begin{bmatrix} X \\ Y \\ 1 \end{bmatrix} + T \right) \qquad (1)$$

$$K = \begin{bmatrix} f_x & 0 & c_x \\ 0 & f_y & c_y \\ 0 & 0 & 1 \end{bmatrix}$$

is an intrinsic parameter matrix of the camera, R is a rotation matrix of the global coordinate system relative to the camera coordinate system, T is a translation vector of the global coordinate system relative to the camera coordinate system, a is a scale factor.

According to Zhang Zhengyou's camera calibration algorithm, a black-and-white checkerboard is used as a calibration image. For each frame of calibration image, two groups of corresponding points are obtained using corner point detection. One group includes coordinates of each corner point in a checkerboard coordinate system (global coordinate system), which is measured and recorded before calibration. Another group includes the two-dimensional image coordinates $$\begin{bmatrix} u \\ v \end{bmatrix}$$

in the image coordinate system of the corresponding points detected by the corner point detection. Theoretically, the two groups of points satisfy equation (1). In practice, due to the image noise and measurement error, only a least square solution may be obtained:

Assuming the value of Z is 0 in the checkerboard coordinate system, then based on equation (1), one can derive:

$$\begin{bmatrix} u \\ v \\ 1 \end{bmatrix} = \alpha K \left( R \begin{bmatrix} X \\ Y \\ 0 \end{bmatrix} + T \right) = \alpha K \left( [r_1 \ r_2 \ r_3] \begin{bmatrix} X \\ Y \\ 0 \end{bmatrix} + T \right) = \alpha K [r_1 \ r_2 \ t] \begin{bmatrix} X \\ Y \\ 1 \end{bmatrix}.$$

For each calibration image, assuming $$H = [h_1 \ h_2 \ h_3] = [\bar{h}_1 \ \bar{h}_2 \ \bar{h}_3]^T = K[r_1 \ r_2 \ T], \text{ then}$$

$$\begin{bmatrix} u \\ v \\ 1 \end{bmatrix} = \alpha H \begin{bmatrix} X \\ Y \\ 1 \end{bmatrix}.$$

A homographic matrix H can be obtained through optimization based on the two groups of corresponding points. The optimization method may include:

$$\text{Let } m_i = \begin{bmatrix} u_i \\ v_i \end{bmatrix}, M_i = \begin{bmatrix} X_i \\ Y_i \\ 1 \end{bmatrix}, \hat{m}_i = \alpha H M_i = \frac{1}{\bar{h}_3^T M_i} \begin{bmatrix} \bar{h}_1^T M_i \\ \bar{h}_2^T M_i \end{bmatrix},$$

where i represents each group of corresponding points in the image, then the objective function for optimization is:

$$\Sigma_i (m_i - \hat{m}_i)^t (m_i - \hat{m}_i) \quad (2)$$

Let $x = [\bar{h}_1^T \ \bar{h}_2^T \ \bar{h}_3^T]^T$, then equation (1) may be converted into the following form:

$$\begin{bmatrix} M_i^T & 0 & -u M_i^T \\ 0 & M_i^T & -v M_i^T \end{bmatrix} x = 0.$$

This is a 2*9 matrix, corresponding to a set of linear equations. For all of the i groups of corresponding points in the image, there are 2i*9 matrices, corresponding to 9 unknown parameters and 2i equations. For such equations, the least square solution if the optimal solution of the target function (2).

The optical solution corresponds to a homographic matrix H in each frame of image, $H = K[r_1 \ r_2 \ T]$. In order to solve the intrinsic parameter matrix based on each homographic matrix H, the following constraints may be needed:

$$h_1^T K^{-T} K^{-1} h_2 = 0$$

$$h_1^T K^{-T} K^{-1} h_1 = h_2^T K^{-T} K^{-1} h_2$$

Because r1 and r2 are perpendicular to each other and are both unit vectors.

Let $B = K^{-T} K^{-1}$, then $h_i^T B h_j$ may be expressed in the form of $v_{ij}^T b$, where b is a 6-dimension vector formed by elements in B (because B is a real symmetric matrix, only 6 elements are to be determined), then the constraints may be expressed in the form of a equation:

$$\begin{bmatrix} v_{12}^T \\ (v_{11} - v_{22})^T \end{bmatrix} b = 0.$$

For each frame of image, the above equation can be satisfied. Then n frames of images correspond to a set of linear equations having 2n equations and 6 unknown parameters. The least square solution may be solved to obtain an optical B. The intrinsic parameter matrix K of the camera may be solved.

Based on the intrinsic parameter matrix K, actual coordinates of a point in the camera coordinate system may be calculated based on a depth z of the point obtained by the TOF camera and the coordinates $$\begin{bmatrix} u \\ v \end{bmatrix}$$

of the point in the two-dimensional image. Three-dimensional coordinates $$\begin{bmatrix} x \\ y \\ z \end{bmatrix}$$

in the camera coordinate system may be calculated using the following equation:

$$\begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} \frac{x}{z} \\ \frac{y}{z} \\ 1 \end{bmatrix}.$$

The three-dimensional coordinates of each point in the camera coordinate system correspond one-by-one to the two-dimensional image coordinates in the image coordinate system. After finishing the TOF camera calibration, a storage device may store these two types of coordinates of a point of interest.

Figure 2:
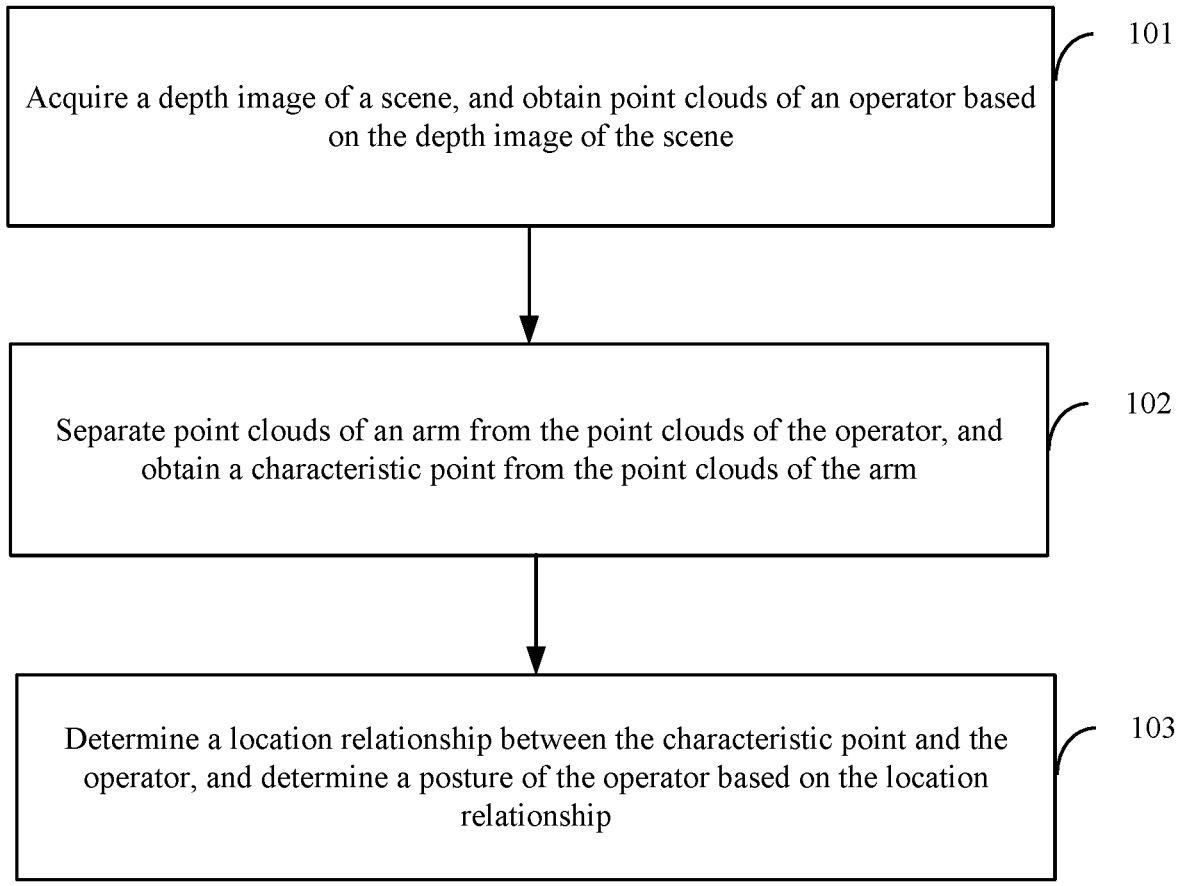
FIG. 2 is a flow chart illustrating a posture recognition method, according to an example embodiment.

FIG. 2 is a flow chart illustrating a posture recognition method. As shown in FIG. 2, the method may include:

Step 101: acquiring a depth image of a scene, and obtaining point clouds of an operator based on the depth image of the scene;

Step 102: separating point clouds of an arm from the point clouds of the operator, and obtaining a characteristic point from the point clouds of the arm;

Step 103: determining a location relationship between the characteristic point and the operator, and determining a posture of the operator based on the location relationship.

In some embodiments, the depth image of the scene to be measured is acquired. The depth image may be processed with a suitable algorithm to obtain the point clouds of the operator. The point clouds of the operator may be divided (or separated) to determine the point clouds of the arm. A characteristic point may be determined from the point clouds of the arm. The location relationship between the characteristic point and the operator may be determined. Based on the location relationship, the posture of the operator may be determined. The posture may be used to control the movable platform.

The entity for executing step 101 may be the movable platform, which may include, for example, an unmanned aerial vehicle, an unmanned ground vehicle, a boat, a robot, etc. The present disclosure does not limit the type of the movable platform. The following descriptions use the unmanned aerial vehicle ("UAV") as an example. The UAV may acquire the depth image of the scene using an acquisition device carried by the UAV. The acquisition device may be a depth imaging device, such as an active depth imaging device and/or a passive depth imaging device. The active depth imaging device may include a TOF camera, a laser scanner, etc. The passive depth imaging device may include at least one of monocular camera that can generate a three-dimensional vision based on multiple times of photographing, or a binocular camera, etc. The present disclosure does not limit the type of depth image acquisition device, as long as the device can acquire depth images or obtain depth images based on acquired images. The following descriptions use the TOF camera as an example of the depth image acquisition device. The TOF camera may transmit an electromagnetic signal to the operator, and may receive an electromagnetic signal reflected by the operator. The TOF camera may output a depth image regarding the operator and the background scene.

In some embodiments, the point clouds of the operator may be obtained through the depth image of the scene. The operator may be recognized from the operator's point clouds through a detection algorithm. For example, different operators may be recognized based on points of different depths in the point clouds. For an operator, various parts of the operator have different distances to the TOF camera. Thus, the depths of the various part of the operator are different in the depth image. Therefore, a body of the operator may be determined based on different depth information, the differences of depths of the body being within a predetermined range. Other parts of the operator may be similarly determined. For example, point clouds of the head of the operator may be determined based on depth difference, because the depths of the majority parts of the head have a relatively large difference compared to the depths of the surrounding points. Then, parts connected with the head may be determined, such as the body and the limbs. In some embodiments, the body may be first determined, because two sides of the body have relatively large differences in depth compared to surrounding points. Then other parts may be determined.

In some embodiments, a capturing center may be set. Point clouds within a predetermined range may be obtained based on regular or irregular images. The capturing center may be set at the forward direction of the TOF camera. For example, the capturing center may be set at 0.1 m to 20 m forward of the TOF camera. A person having ordinary skills in the art may select a suitable distance based on actual needs.

In some embodiments, an external signal may be input to determine a point on the depth image. The operator may be detected as being connected to the point. For example, when multiple targets exist in the depth image of the scene, the operator may be determined from the multiple targets based on the input signal.

In some embodiments, the external signal may be input from an application ("APP") provided on a terminal. When a user input on an interface of the terminal, a signal carrying the location information may be generated. The signal may be input to the movable platform.

In some embodiments, template matching may be used based on one or more suitable templates. During the matching, the depth image may be divided into pieces and each piece may be matched, or the template matching may be based on the entire depth image.

In some embodiments, the operator may be recognized using other algorithms, such as dynamic time warping ("DTW").

In some embodiments, the operator may be recognized using machine learning or deep learning algorithms. For example, the neural network of the machine learning or deep learning may be trained using existing images. A training image set may be obtained based on multiple trainings. An acquired depth image may be processed using the neural network to detect the operator.

In some embodiments, the operator may be detected using clustering methods. For example, the depth image may be processed into different clusters. Each cluster may be matched to detect the operator. The present disclosure does not limit the methods for detecting the operator.

In some embodiments, obtaining the point clouds of the operator may include obtaining point clouds of a part or portion of the operator, such as a body, a head, limbs, etc.

In some embodiments, the body may be first detected, and then the head and limbs may be detected. In some embodiments, the limbs may be first detected. In some embodiments, the head may be first detected. Detection methods may be any of the above described detection methods.

In some embodiments, the operator may be a human being or a robot, etc. The following descriptions use the human being as an example. Each pixel of the depth image may be stored using its coordinates. The location and size of the operator may be stored using point clouds. Calculation may be performed based on coordinates in the image coordinate system in which the depth image is located, or based on the coordinates in the camera coordinate system. The conversion method is similar to that of TOF camera calibration.

In some embodiments, in step 102, various methods may be used to separate the point clouds of the arm from the point clouds of the operator, and to detect the arm of the operator in the depth image based on a depth detection algorithm. For example, the body of the operator may be first detected. The arms of the operator may then be detected based on detecting a connecting area connected with the body. In some embodiments, a frame may be used to specify the body of the operator in the point clouds of the operator. Portions of the operator outside of the frame may be regarded as arms. In some embodiments, a signal may be provided to confirm that the arms are detected. In some embodiments, classification method may be used to determine which type of clusters of point clouds represent arms.

In some embodiments, both of the two arms may be detected. In some embodiments, one arm may be detected. In the image coordinate system, the two arms may be separated as left arm and right arm. In some embodiments, the forward direction and the reverse direction of the U or V axis may be regarded as the left arm and right arm, or the right arm and left arm.

In some embodiments, the locations of the arms are obtained, i.e., the point clouds of the arms are obtained. A characteristic point may be obtained from the point clouds of the arm based on a preset rule. The characteristic point may have various locations, and the method of obtaining the characteristic point may use various methods. Obtaining the characteristic point may include: obtaining a characteristic point that is furthest from the operator, obtaining a characteristic point that has a greatest depth difference relative to the operator, etc. The method for obtaining the characteristic point may include: obtaining the characteristic point through calculating block distance, obtaining the characteristic point through template matching algorithms, etc.

In some embodiments, in step 103, after the location of the characteristic point is determined, the location relationship between the characteristic point and the operator may be determined. The location relationship with the operator may be a location relationship with a calibration point of the operator. The calibration point of the operator may be a median point of all of the coordinates of the operator, or the point having the highest or lowest pixel value in the vertical axis, or the point having the highest or lowest depth, etc. Through determining the location relationship between the characteristic point and the operator, the posture of the operator may be determined. For example, based on the elbow point or the hand, it may be determined whether the elbows of the operator bend on two sides of the body, whether the arms are raised upwardly, or a combination thereof. Different controls may be triggered based on different target postures to control the UAV to execute different operations. The operations may include at least one of: photographing, moving away from the target, moving closer to the target, start/stop video recording, rotating around at the current location, playing music, etc.

In some embodiments, through the new posture recognition methods of the present disclosure, the movable platform may be controlled through the posture, thereby simplifying the control command for the movable platform, and enriching the control methods of the movable platform. The success rate of posture recognition is increased due to the posture recognition methods.

Figure 3:
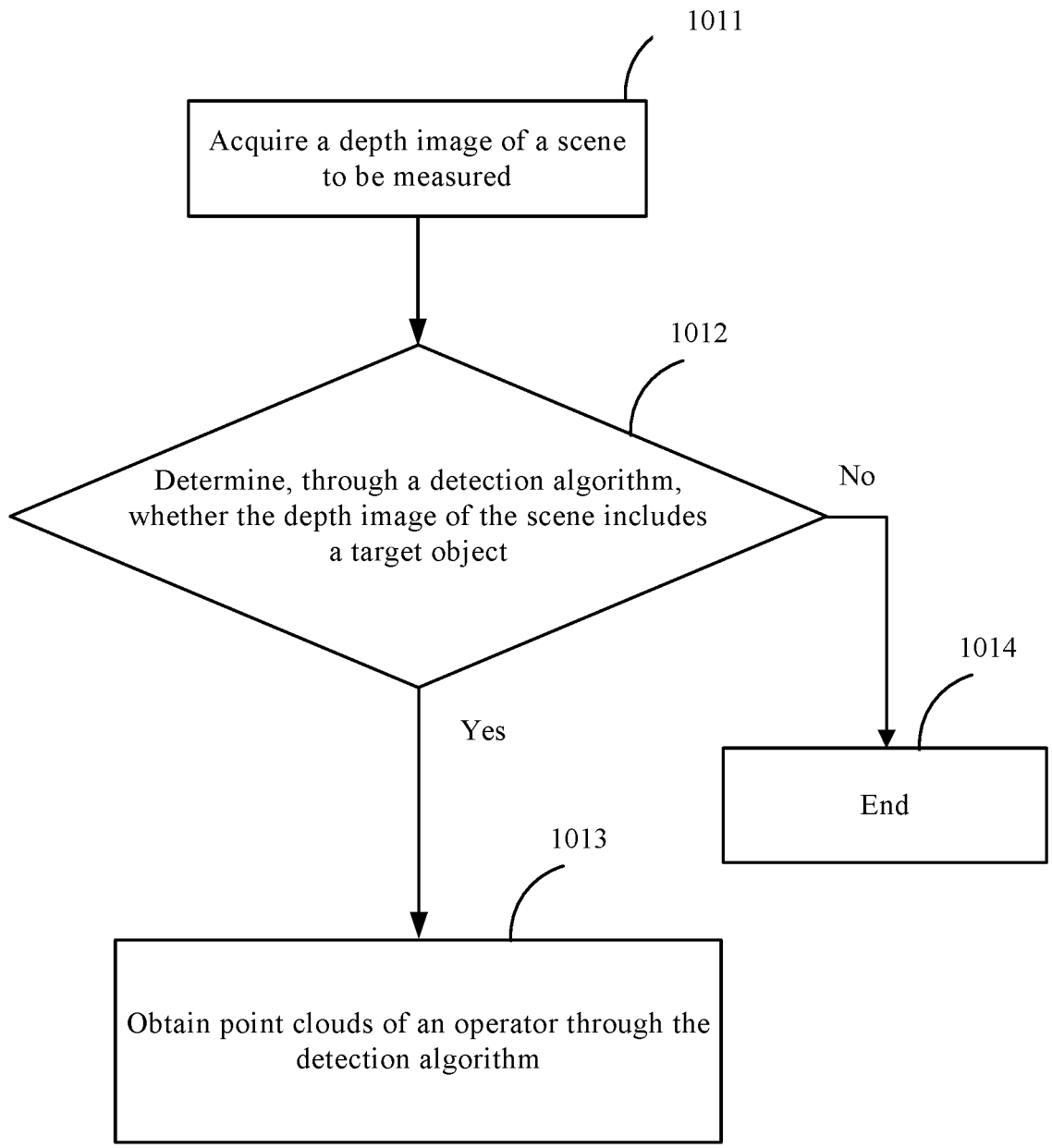
FIG. 3 is a flow chart illustrating a posture recognition method, according to another example embodiment.

In some embodiments, step 101 may be a posture recognition method shown in FIG. 3. The method may include:

Step 1011: acquiring a depth image of a scene to be measured;

Step 1012: determining, through a detection algorithm, whether the depth image of the scene includes a target object;

In some embodiments, various methods described above may be used to determine whether the depth image of the scene includes the target object. For example, calculation of different depths may be used to determine whether the target object exists in the depth image. In some embodiments, a capturing center may be set, and point clouds images within a predetermined range of the capturing center may be captured. In some embodiments, template matching may be used to determine whether there exists the target object. In some embodiments, machine learning or deep learning may be applied to process the depth image. The depth calculation may be performed to determined that the target object exists in the depth image. For example, a portion of the depth image may have a depth that has a relatively large difference from the surrounding portions. In some embodiments, connected point cloud image portions may be detected within a predetermined range of the capturing center. In some embodiments, machine learning or deep learning may conclude that the depth image includes the target object. In some embodiments, template matching may conclude that there exists the target object. If the depth image of the scene includes the target object (step 1012: Yes), then the process goes to step 1013, otherwise (step 1012: No), the process goes to step 1014. The target object may be the operator, or a part or portion of the operator, or be different from the operator.

In some embodiments, step 1013 may include obtaining point clouds of an operator through the detection algorithm.

In some embodiments, the point clouds of the operator may be obtained from the depth image of the scene using the above described methods.

In some embodiments, step 1013 may further include: point clouds of a body of the operator may be determined from the depth image of the scene using the detection algorithm.

Figure 4:
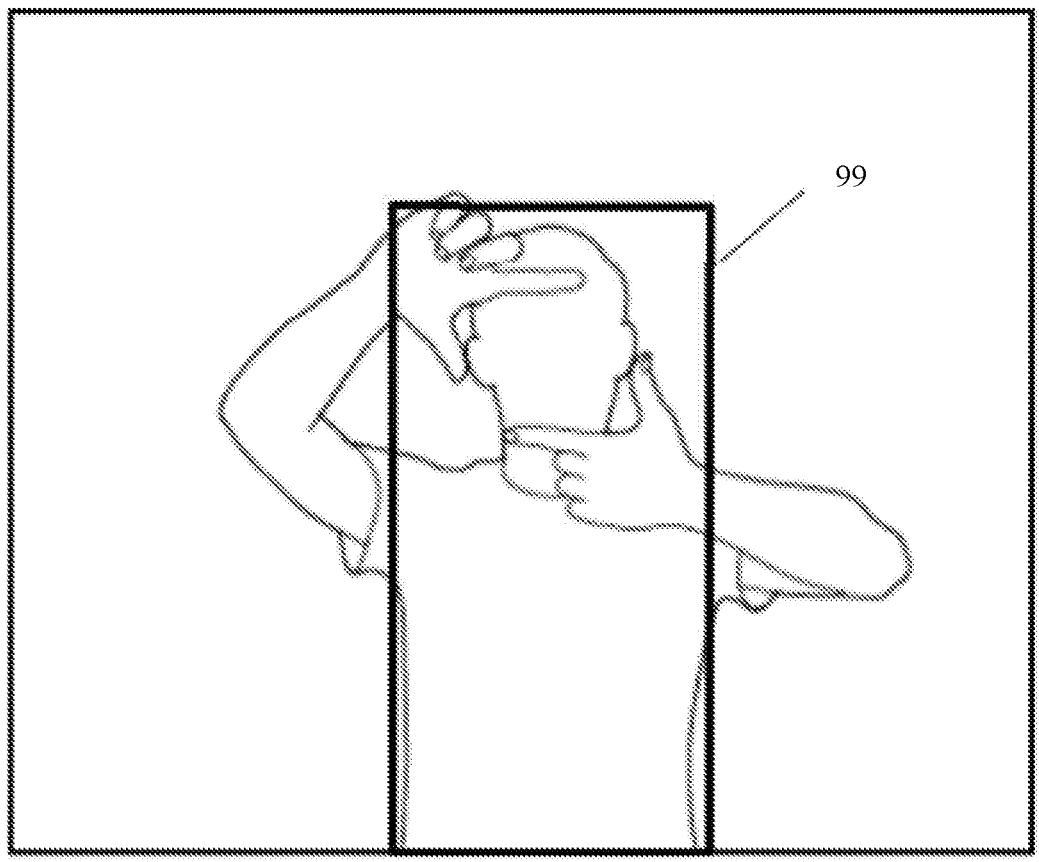
FIG. 4 is a schematic illustration of a recognition frame in a depth image, according to an example embodiment.

In some embodiments, the above described methods may be used to search for the point clouds of the operator or the body of the operator. As shown in FIG. 4, after the point clouds of the operator or the body of the operator are obtained, a regular or irregular frame 99 may be used to identify the point clouds. Here, a rectangular frame is used as an example. The rectangular frame may be expressed as $(x_b, y_b, w_b, h_b)$, where $(x_b, y_b)$ are coordinates of the left upper corner point of the rectangle, $w_b$, $h_b$ represent the width and height of the rectangle, respectively. The depth of the body is $d_b$. The location of the rectangle may be determined based on the location of the operator. The side of the frame 99 may be determined based on the size of the body, such that the frame 99 may frame the body of the operator or a portion of the body of the operator. When the depth image includes multiple targets, the frame 99 may enclose a target based on predetermined location or based on an external input.

In some embodiments, a set (or collection) formed by the point clouds of the body and point clouds connected with the point clouds of the body may be determined as the point clouds of the operator.

In some embodiments, pixels connected with the point clouds of the body within a predetermined depth may be obtained through a connected region detection algorithm. The predetermined depth may be any pre-set value, such as −1 to 1 m, or may be set by an external input, or may be adjusted based on other information. In some embodiments, a set formed by point clouds that have pixels adjacent the point clouds of the body within a predetermined depth may be determined as the point clouds of the operator. In some embodiments, a depth of a point on the body may be determined as a calibration depth. In some embodiments, a depth of an average value of all of the points of the body or some points of the body may be determined as the calibration depth. In some embodiments, the calibration depth may be a depth of a point found in each connected region. The point clouds of the operator may be determined as the points within a predetermined depth of the calibration depth. As such, the location of the operator in the depth image may be determined.

In some embodiments, the recognition method of the present disclosure may recognize the body of the operator, and then recognize the entire operator, thereby more accurately recognizing the operator. The recognition rate is increased, and the likelihood of false recognition is reduced.

In some embodiments, step 1013 may also include: receiving a signal.

In some embodiments, the signal received may include location information. The location information may be the location information of the point on the depth image of the scene.

In some embodiments, based on the location, a set formed by point clouds connected with the location may be determined as the point clouds of the operator.

In some embodiments, through a connected region detection algorithm, a set of pixel points connected with the location within a predetermined depth may be determined. The predetermined depth may be −1 to 1 m. A set formed by all of the point clouds that are associated with pixels adjacent the location within a predetermined depth may be determined as the point clouds of the operator. As such, the location of the operator in the depth image may be determined.

In some embodiments, through the above recognition method, a set of point clouds of the operator in the depth image may be determined. The operator may be effectively recognized, in particular, from multiple targets, thereby increasing the success rate of the recognition.

Step 1014: ending the process.

In some embodiments, the process may be ended when an operator is not recognized in the acquired depth image.

In some embodiments, through the above methods, it may be determined whether the depth image includes the operator. If the depth image does not include the operator, other operations may be continued. This may reduce the occupation of the system resources, increase the recognition rate, and reduce the likelihood of false recognition.

Figure 5:
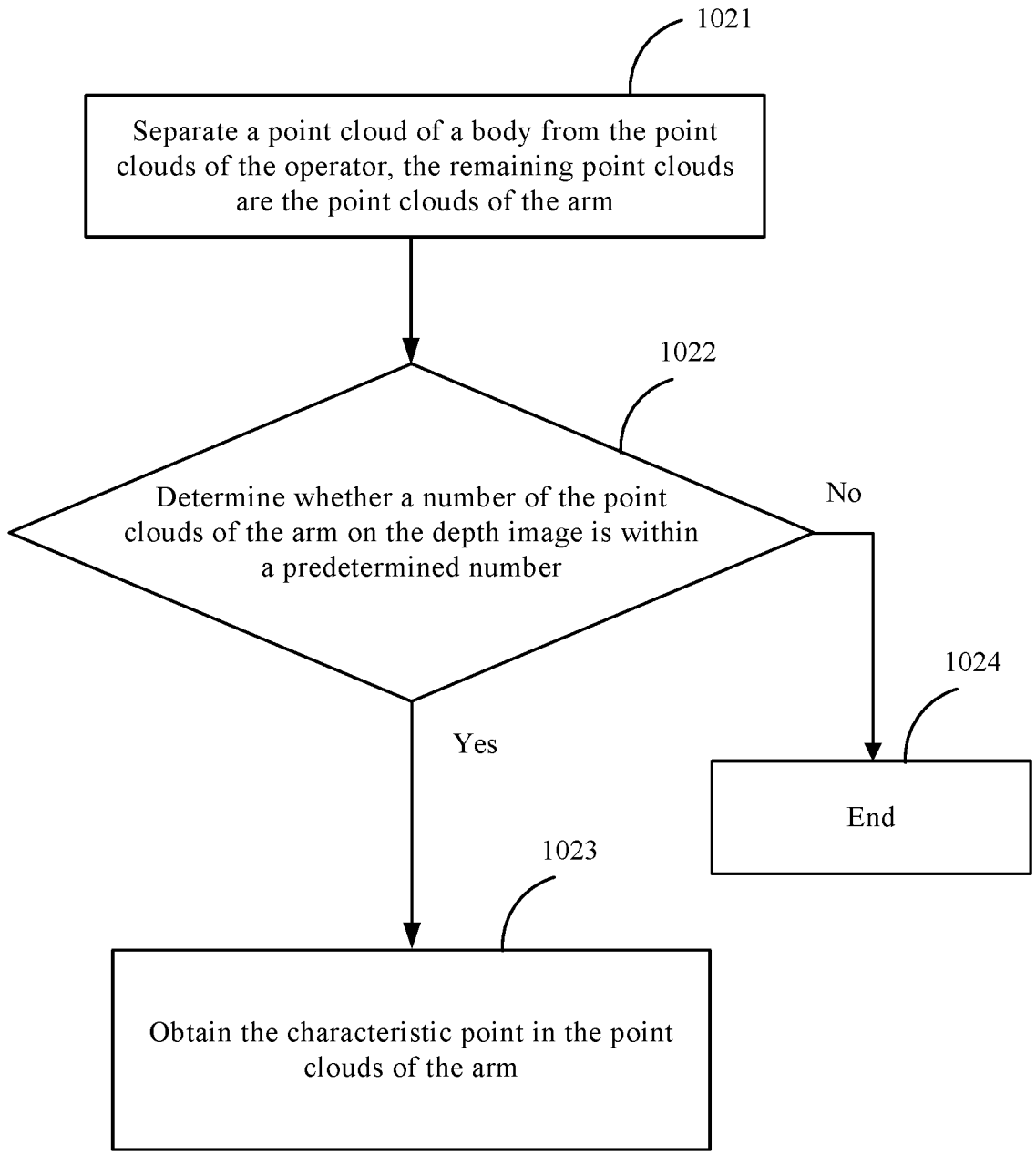
FIG. 5 is a flow chart illustrating a posture recognition method, according to an example embodiment.

In some embodiments, step 102 may be the posture recognition method shown in FIG. 5. The method may include:

Step 1021: separating a point cloud of a body from the point clouds of the operator, the remaining point clouds are the point clouds of the arm.

Various methods may be used to separate the point clouds of the arm from the point clouds of the operator.

In some embodiments, when the point clouds of the operator are obtained through searching for the connected regions based on the depth point clouds of the body, because the point clouds of the body have already been found, the point clouds of the body may be separated from the point clouds of the operator. The remaining point clouds are the point clouds of the arms.

In some embodiments, the point clouds of the arms may include point clouds of the legs. If points having the same vertical axis values as the point clouds of the body are excluded, the remaining point clouds are the point clouds of the arms, or portions of the arms.

In some embodiments, the arms may be recognized through a classification method. Because the target point clouds of an object to be measured may include point clouds of multiple parts of the operator, such as hands, arms, head, body, and legs, etc., to extract the point clouds of the arms of the operator, the point clouds of the operator may be classified. Classification may result in at least one cluster of point clouds. The point clouds of the arms may be determined from the cluster obtained from classification.

In some embodiments, the point clouds may be classified using a cluster algorithm. For example, the classification may be based on the k-mean of the cluster algorithm. K-mean clustering is a non-supervised classification algorithm. The number of clusters for classification may be specified prior to classification. If it can be determined that only the body and arms of the operator exist in the detection range of the TOF camera, then the number of clusters may be 2. In actual situations, in addition to the operator in the detection range of the TOF camera, there may be other objects, or in the detection range of the TOF camera, only the arms of the operator exist and the body of the operator does not exist. Accordingly, the number of clusters for clustering is not certain. If the number of clusters for classification is greater than an actual number of clusters, then point clouds that would otherwise be classified in the same cluster may be separated. Conversely, point clouds that would otherwise be classified in different clusters may be included in the same cluster. Therefore, in the present disclosure, during the point clouds classification process using a cluster algorithm, the number of clusters used in the cluster algorithm may be adjustable. The adjustment to the number of clusters used in the cluster algorithm is explained below.

In some embodiments, the number of clusters may be adjusted based on the degree of dispersion of the clusters. The degree of dispersion may be represented by the distances between centers of the clusters. Prior to executing the cluster algorithm, the initial number of clusters may be set as n. For example, n may be set as 3. The number n may be an adjustable parameter during the cluster calculation. In some embodiments, a k-mean based clustering may be performed to obtain the cluster center of each cluster. The degree of dispersion may be calculated based on the cluster centers. If a distance between at least two cluster centers is smaller than or equal to a predetermined distance specified in the cluster algorithm, then the number n may be reduced by 1, and the clustering may be repeated. The predetermined distance may also be an adjustable parameter. For example, the predetermined distance may be set within 10-60 cm. In some embodiments, the predetermined distance may be set as 10 cm, 15 cm, 20 cm, 25 cm, 30 cm, etc. If the classification effect of the cluster algorithm is poor, then the number n may be increased by 1, and the clustering may be repeated. When distances between all of the cluster centers are greater than or equal to the predetermined distance, the cluster algorithm may be terminated. At this state, the classification of the point clouds representing the operator is completed. The process may output the number of clusters and the cluster centers.

In some embodiments, a cluster of point clouds of the arm may be determined from the multiple clusters based on the depth information. Point clouds of a palm may be determined from cluster of the point clouds of the arm. In some embodiments, the point clouds of the operator may be classified to obtain at least one cluster. Based on a priori information, when the operator makes a hand gesture while facing the TOF camera, the arm portion of the body is relatively closer to the TOF camera. That is, the depth of the arm portion of the operator is the smallest. Thus, the average depth of a cluster may be calculated for all of the clusters resulting from the classification. The cluster having the smallest average depth may be determined as a cluster for the arm portion of the operator. As such, the arm of the operator and the point clouds of the arm may be determined from the point clouds of the operator. For example, after the point clouds of the arm portion of the operator are obtained, the point clouds of the arm of the operator may be determined from the point clouds of the arm portion of the operator.

In some embodiments, the arm may be determined based on a depth searching method. For example, a palm may be determined first. This is because when the arm is in front of the body, a distance between the arm to the TOF camera is the smallest, i.e., the depth value is the smallest. Multiple points having the smallest depth values may be obtained. All points connected together may be obtained through a flood fill method. The range of depth used in the flood fill method may be determined based on actual need.

In some embodiments, step 1021 may include: calculating a location of a frame based on a location of the point clouds of the body, and calculating a size of the frame based on a range of the point clouds of the body.

In some embodiments, the point clouds of the operator or the body may be obtained using the above methods. The location of the frame may be determined based on the point clouds of the operator or the body. For example, a center of the frame may be set within a range of a center of the point clouds of the operator or the body. The range may be specified based on the actual need by a person having ordinary skills in the art.

In some embodiments, two centers may be placed overlapping one another. In some embodiments, the frame may be placed according to other standards. For example, a side of the frame may be placed to overlap edge pixels of point clouds of the operator or the body. In some embodiments, the location of the frame may be determined based on input information. "For example, the information may be external input information, which may be input by the operator. The input information may include the location information. The location information or coordinates calculated based on the location information may be used as the location of the frame. In some embodiments, the point clouds of the body obtained using the clustering method may be identified using the frame.

In some embodiments, the size of the frame may be determined based on the point clouds of the operator or the body of the operator. For example, the size of the frame may be determined based on the edge pixels of point clouds of the operator or the body. In some embodiments, the frame may enclose the operator or the body completely, or may enclose all of the point clouds. In some embodiments, the size of the frame may be specified based on actual need such that the frame may enclose only point clouds of the operator or the body in a specified range.

In some embodiments, the frame may enclose the point clouds of the body just right. The size of the frame may be selected based on a predetermined algorithm, or based on an input according to actual need.

In some embodiments, the size of the frame may be determined before the location of the frame is determined, or the location of the frame is determined before the size of the frame is determined. The frame may use a regular or irregular shape to represent, such as a rectangle, a circle, a triangle, or a shape that matches the body, etc.

In some embodiments, a frame identification may be determined based on the location of the frame and the size of the frame.

In some embodiments, various methods may be used to identify the frame based on the location and size of the frame. For example, the frame may be represented by a rectangle $(x_b, y_b, w_b, h_b)$, where $(x_b, y_b)$ are the coordinates of the left upper corner point of the rectangle, $w_b$, $h_b$ are the width and the height of the rectangle, respectively. The location of the rectangle may be determined based on the location of the operator. The size of the rectangle may be determined based on the size of the body, such that the rectangle may enclose the body of the operator. When the depth image includes multiple objects, identifying an object using the rectangle frame may be performed based on a predetermined location, or based on an external input.

In some embodiments, point clouds of the operator located outside of the frame may be determined as the point clouds of the arm.

In some embodiments, the point clouds of the operator outside of the frame may be determined as the point clouds of the arm. For example, among the point clouds of the operator, the set of point clouds located to the left of the rectangle frame may be determined as the point clouds of the left arm. The left side of the rectangle frame may be in the forward direction or the reverse direction of the U axis in the image coordinate system. In some embodiments, the left and right direction relative to the rectangle frame may be the left and right direction in an image plane perpendicular to the gravity. The specification of the left and right directions may be exchanged based on actual need. For example, the horizontal coordinate x of the left arm may be smaller than the horizontal coordinate $x_b$ of the edge point of the rectangle frame. The size of the left arm may be represented as $S_l$. A set of point clouds located to the right of the rectangle frame may be determined as the point clouds of the right arm. The horizontal coordinate x of the right arm may be greater than the horizontal coordinate $x_b + w_b$ of the edge point of the rectangle frame. The size of the right arm may be represented as $S_r$.

In some embodiments, through the above recognition methods, the set of point clouds of the arm of the operator may be accurately determined from the depth image. It may be further determined whether there is a predetermined posture in the depth image, which may further improve the recognition success rate.

Step 1022: determining whether a number of the point clouds of the arm on the depth image is within a predetermined number.

In some embodiments, the point clouds of the arm may be obtained through various methods described herein. Using the above-described algorithm for determining the point clouds of the arm, various sizes of the arm may be determined. For example, the size of the entire arm, or the size of the arm excluding the portion covered by the body, or the size of the arm located outside of the frame. After the size of the arm is determined, it may be further determined whether the arm is placed in front of the body or behind the body, covering by different portions of the arm, such as the covering between the upper arm and the lower arm, and the size of the arm relative to the body. Here the size may include an area of the point clouds of the arm, or a number of point clouds of the arm. When the postures are different, the areas of the arm in the depth image are different. For example, the areas are different for the same arm when the arm is raised upwardly and when the arm is bent (e.g., upper and lower arms are folded). The area may be represented by the number of points in the depth image of the scene. As such, after normalization, the area may be used to replace the number of point clouds of the arm.

In some embodiments, based on calculating the number of point clouds of the arm, the size of the arm $S_l+S_r$ may be determined. In some embodiments, the number of point clouds of the left arm and the right arm may be separately calculated to obtain the size of the left arm $S_l$ and the size of the right arm $S_r$. The size may be the area of the point clouds of the arm in the depth image or the left arm and/or right arm. In some embodiments, the size may be the actual area $\|S_l+S_r\|d_b^2$, $\|S_l\|d_b^2$, or $\|S_r\|d_b^2$ or of the arm in the depth image plane. In other words, the actual area may be the point clouds of the arm multiplied by the square of the depth value of the body. With different postures, the area of the arm in the depth image may be different. For example, the area of the arm may be different for: when the arm is in front of the body and behind the body, when the arm is folded such that a portion of the arm is covered by another portion of the arm, etc. A first predetermined value may be set based on the different areas. For example, when the depth of the arm in the depth image is within a predetermined range, it may be determined that there is a posture based on a range of the area of the arm. In some embodiments, the first predetermined value may be set for determining what actions the arms are taking. The first predetermined value may be determined based on actual needs by a person having ordinary skills in the art. For example, the actual size of the arm in the depth image may be a factor multiplied by the square of the focal length of the camera. When the arm is folded, a size of the arm may be set to be within a range: $0.01f^2 \leq \|S_l\|d_b^2 \leq 0.05f^2$. That is, when a typical operator bends the arm, the area of the arm in the depth image plane may be between 0.01 to 0.05 m$^2$. When the arm is extended, the size of the arm may be set within a range: $0.05f^2 \leq \|S_l\|d_b^2 \leq 0.08f^2$. Other suitable range may be used. The range given here are examples only. When the area of the arm is within the first predetermined value, the next step 1023 may be performed. When the area of the arm is not within the first predetermined value, the step 1024 may be executed, which ends the determination process.

In some embodiments, an angle between the upper arm and the lower arm may be detected. When the angle between the upper arm and the lower arm is within a second predetermined value, e.g., when the angle is in a range of [10°, 75°], it may be determined that the arm is in a bent state. When the angle is in a range of [170°, 190°], it may be determined that the arm is in an extended state. In some embodiments, the point clouds of the arm may be found using the above-described methods. A determination may be made as to whether the point clouds of the arm are arranged in a straight line. If the point clouds are arranged in a straight line, it may be determined that the arm is in an extended state. If the point clouds are not arranged in a straight line, it may be determined that the arm is in a bent state. The angle between the upper arm and the lower arm may be obtained by processing the continuous arm (left arm, right arm, or the arms as a whole). The processing methods may include, but not be limited to, fitting of the point clouds, fitting of the templates, etc. Based on the angle between the upper arm and the lower arm, the state of the arm may be determined. When the angle between the upper arm and the lower arm is within the second predetermined value, step 1023 may be performed. Otherwise, step 1024 may be performed, which may terminate the determination process.

In some embodiments, the location of the upper arm may be determined based on an angle between the upper arm and the body. The angle may be within a fourth predetermined value. For example, when the angle is within [0°, 100°], it may be determined that the upper arm is at an outer side of the body and under the shoulder. Otherwise, the upper arm may be determined to be located at the outer side of the body and above the shoulder. In some embodiments, the optimum angles for recognizing that the arm is located outside of the body may be [80°, 100°]. When angle is within this range, it may be determined that a recognizable action is performed by the arm. In some embodiments, point clouds of the arm may be determined by the above-described methods. Here, pixel points of the upper arm may be processed to obtain the angle between the upper arm and the body. The methods for processing the pixel points may include, but not be limited to, fitting of the point clouds, fitting with the templates, etc. Based on the angle between the upper arm and the body, the state of the arm may be determined. When the angle between the upper arm and the body is within the fourth predetermined value, step 1023 may be performed. Otherwise, step 1024 may be performed, which terminates the determination process.

In some embodiments, using the above methods to determine the state of the arm may increase the recognition success rate, and increase the degree of distinction of actions.

In some embodiments, the characteristic point may include, but not be limited to, a characteristic point on the elbow, a characteristic point on the palm, a characteristic point on the arm. A pixel point of the palm may include a center point of the hand. The characteristic point of the arm may include a center point of the upper arm, a center point of the lower arm, etc. The characteristic point may be obtained using various different methods. For example, when an elbow point is a characteristic point, assuming an example of action recognition is the bending of the arm, the elbow point may be detected as the furthest point from the body. The method for obtaining the elbow point may include: for all of the point clouds of the arm, a comparison may be made between distances between the point clouds and a calibration point of the operator. The calibration point may be one or more of the calibration points determine for the operator, including, for example, a center point of the point clouds of the operator, an average point of the point clouds of the operator, an edge point of the point clouds of the operator, etc. The coordinates of the average point may be the average value of the coordinates of all of the point clouds of the body or the operator. The depth of the average point may be the average value of the values of all of the point clouds of the body or the operator. The average point may have both of the coordinates of the average point and the depth of the average point. The edge point may be the lowest pixel point in the gravity direction among the point clouds of the body or the operator, or the highest pixel point, or a pixel point in the horizontal direction, etc.

In some embodiments, the distance may be a geometric distance. If the coordinates of a point on the arm are $(x_i, y_i)$, the coordinates of the calibration point are $(X, Y)$, then the geometric distance may be $z=\sqrt{(X-x_i)^2+(Y-y_i)^2}$. After obtaining the geometric distances for all of the pixel points of the arm, the point with the greatest geometric distance may be determined as the elbow point. In some embodiments, the distance may be a block distance. If the coordinates of a point on the arm are $(x_i, y_i)$, the coordinates of the calibration point are $(X, Y)$, then the block distance is $z=|X-x_i|+|Y-y_i|$. In the point clouds, the point having the greatest distance may be determined as the elbow point. In some embodiments, the distance may be a weighted block distance. The weight block distance may be $z=a|X-x_i|+b|Y-y_i|$. In some embodiments, the weights may be a=3, b=1. The point selected using the weighted block distance may be closer to the elbow. This method may also be used for obtaining other characteristic points. The above method may be used to obtain an extreme value, a median value, or a specified value.

Step 1024: terminating the process.

In some embodiments, through the above method, the arm may be better separated from the body in the depth image. The location of the arm may be determined. Characteristic point(s) of the arm may be obtained. The disclosed method may increase the recognition success rate.

Figure 6:
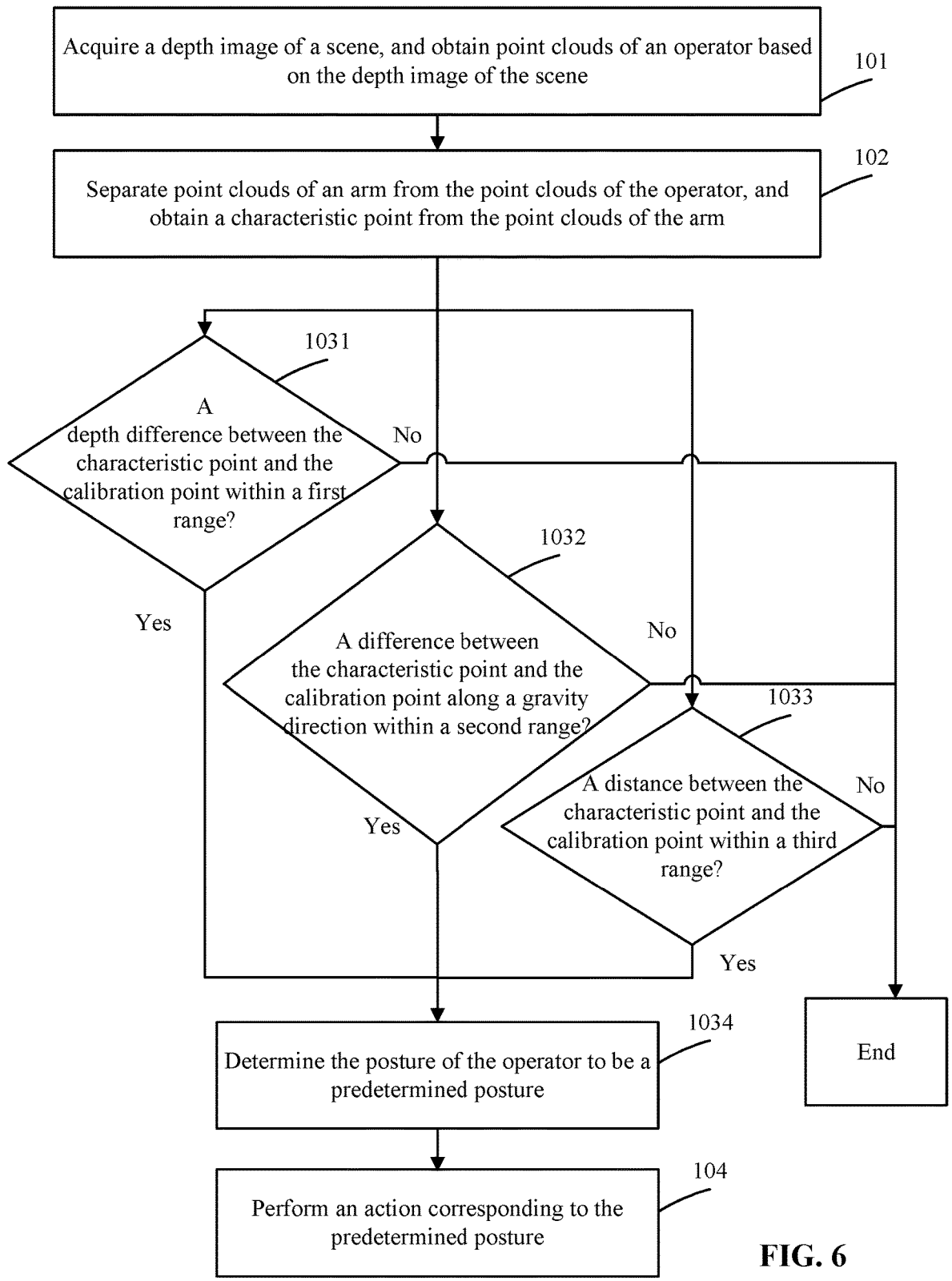
FIG. 6 is a flow chart illustrating a posture recognition method, according to an example embodiment.

In some embodiments, step 103 may be a recognition method shown in FIG. 6. The method may include:

Step 1031: determining whether a depth difference between the characteristic point and the calibration point is within a first range.

In some embodiments, the characteristic point may be obtained through the above-described method. The following discussion uses the elbow point as an example of the characteristic point. The calibration point may be obtained using the above methods. Here, the median value point of the operator is used as an example of the calibration point. A depth difference between the elbow point and the median value point may be determined. When the arm is placed in front of the operator and behind the operator, the depth difference may be within different ranges. When the depth difference is within the first range, it may be determined that the arm is placed in front of the body. In some embodiments, the depth difference being between 0 m and 0.4 m may better indicate a posture in which the arm is placed in front of the body. In some embodiments, different depth differences may be determined for the left arm and the right arm relative to the operator. The posture of the operator may be determined based on the depth difference within different ranges. When the depth difference is within the first range, it may be determined that the elbows are bent and are located on both sides of the body, and that the elbows are in front of the body plane. It may be determined that the posture of the operator is a predetermined posture. The predetermined posture may include: a photographing posture, a video recording posture, etc.

In some embodiments, the characteristic point may be a pixel point of the center of the palm. The calibration point may be obtained using the above methods. Here, the median value point of the operator is used as an example of the calibration point. The depth difference may be calculated between the palm enter point and the median value point. When the arm is place in front of the operator and when the arm is placed at the same plane as the operator, the depth difference may be in different ranges. When the depth difference is within a first range, it may be determined that the arm is placed in the same plane as the operator. In some embodiments, the depth difference being between −0.1 m and 0.1 m may better indicate that the arm is placed in the same plane as the operator. In some embodiments, different depth differences may be determined for the left arm and the right arm relative to the operator. The posture of the operator may be determined based on the depth difference in different ranges. When the depth difference is in the first range, it may be determined that the arm is placed in the same plane as the body. The posture of the operator may be determined to be a predetermined posture, such as a photographing posture, a video recording posture, etc.

Step 1032: determining whether a difference between the characteristic point and the calibration point along the gravity direction is within a second range.

In some embodiments, the characteristic point may be obtained using the above methods. The elbow point may be an example of the characteristic point. The calibration point may be determined using the above methods. Here, an upper edge pixel of the operator (e.g., an upper portion of the head) may be used as an example of the calibration point. A height difference in the gravity direction may be determined between the elbow point and the upper edge pixel. The gravity direction may refer to the reverse direction of the V axis in the image coordinate system. Different heights of the arm correspond to different heights in the gravity direction. When the height difference is within the second range, it may be determined that the arm is placed at the same height as the breast. In some embodiments, the height difference may be from 0 m to 0.5 m. The height difference may refer to the distance in the gravity direction between the elbow and the upper portion of the head of the operator. The height difference may be represented as:

$$0<h<0.5f/d_b$$

$$h=y_b-y$$

Here h is the height difference, f is the focal distance of the camera, $d_b$ is the depth value of the calibration point, y is the vertical coordinate of the elbow point, $y_b$ is the vertical coordinate of the calibration point. Different height differences may be determined for the left arm and the right arm relative to the operator. A posture of the operator may be determined based on the height difference being in different ranges. When the height difference is in the second range, it may be determined that the elbow point is placed at the same height as the breast. It may be determined that the posture of the operator is a predetermined posture, such as a photographing posture, a video recording posture, etc.

In some embodiments, the characteristic point may be a pixel point of the center point of the palm. The calibration point may be determined using the above method. Here, the calibration point may be an upper edge pixel of the head (i.e., the upper portion of the head) of the operator. A height difference in the gravity direction may be determined between the pixel point of the center point of the palm and the upper edge pixel of the operator. Different heights of the arm may result in different height differences. When the height difference is in the second range, it may be determined that the palm is above the head. In some embodiments, the height difference may be between 0 m and 0.5 m. The height difference may refer to the distance in the gravity direction between the pixel point of the center point of the palm and the upper portion of the head of the operator, which may be represented as:

$$0<h<0.5f/d_b$$

$$h=y-y_b$$

Here, h is the height difference, f is the focal distance of the camera, $d_b$ is the depth value of the calibration point, y is the vertical coordinate of the pixel point of the center point of the palm, $y_b$ is the vertical coordinate of the calibration point. Different height differences may be determined for the left arm and the right arm relative to the operator. A posture of the operator may be determined based on the height difference being in different ranges. When the height difference is in the second range, it may be determined that the pixel point of the center point of the palm is higher than the uppermost pixel point of the head of the operator. In other words, it may be determined that the arm is slantly raised up.

It may be determined that the posture of the operator is a predetermined posture, such as a photographing posture, a video recording posture, etc.

Step 1033: determining whether a distance between the characteristic point and the calibration point is within a third range.

In some embodiments, the characteristic point may be obtained using the above method. For example, the elbow point may be an example of the characteristic point. The calibration point may be determined using the above method. Here, the median value point of the operator may be an example of the calibration point. A distance between the elbow point and the median value point in the depth image may be determined. When the geometric distance is in the third range, it may be determined that the arm is placed at a predetermined location in front of the body. The distance may be a Euclidean distance or a Mahalanobis distance, etc. Different geometric distances may be obtained for the left arm and the right arm relative to the operator. A posture of the operator may be determined based on the geometric distance being in different ranges. For example, when the geometric distance is in the third range, it may be determined that the elbow point is located at a predetermined location on the left or right side of the operator. The posture of the operator may be determined as a predetermined posture, such as a photographing posture, a video recording posture, etc.

In some embodiments, the characteristic point may be a pixel point of the center point of the palm. The calibration point may be determined using the above method. Here, the median value point of the operator is used as an example of the calibration point. The geometric distance between the elbow point and the median value point in the depth image plane may be determined. When the geometric distance is in the third range, it may be determined that the arm is located at a predetermined location besides the body. In some embodiments, the geometric distance may be between 0.1 m and 0.3 m. When the geometric distance is within this range, the posture may be more accurately determined. Different geometric distances may be determined for the left arm and the right arm relative to the operator. The posture of the operator may be determined based on the geometric distance being in different ranges. When the geometric distance is in the third range, it may be determined that the pixel point of the center point of the palm is located at a predetermined location on the left or the right of the operator. In other words, it may be determined that the arm may be slantly raised up. The posture of the operator may be determined to be a predetermined posture, such as a photographing posture, a video recording posture, etc.

Step 1034: determining that the posture of the operator to be a predetermined posture.

In some embodiments, after the above steps 1031, 1032, and 1033 are performed, it may be determined whether the posture of the operator is a photographing posture. In some embodiments, whether the posture of the operator is a photographing posture may be determined based on two of the above three steps. In some embodiments, the determination may be made with the above three steps. The performance of the steps 1031, 1032, and 1033 may be in any suitable order, which is not limited in the present disclosure. Any combination of the steps 1031, 1032, and 1033 may be performed in any order or simultaneously.

In some embodiments, the posture of the operator may be a predetermined posture, which may be a photographing posture, a video recording posture, etc.

Step 104: performing an action corresponding to the predetermined posture.

In some embodiments, when the posture of the operator is the photographing posture, a photographing action may be triggered. The photographing action may be performed within a predetermined time after the photographing action is triggered. The predetermined time may be pre-set, or may be modified based on an input through an application ("app"). The camera may acquire images of the operator or a specified location. Before images are acquired, an indicator light installed on the UAV may show different colors or may flash to indicate to the operator the photographing process. For example, after the photographing action is triggered, photographing may be performed within 5 seconds. In the first 3 seconds, the indicator light may flash slowly, and in the last 2 seconds, the indicator light may flash quickly. In some embodiments, in the first 3 seconds, a green indicator light may flash, and in the last 2 seconds, a red indicator light may flash. In other embodiments, a combination of the slow flash, quick flash, and different colors may be used. If the UAV is connected to the app, a voice prompt may be generated on the app.

In some embodiments, when the posture of the operator is determined to be a video recording posture, a video recording action may be triggered. The video recording action may be performed within a predetermined time after the video recording action is triggered. The predetermined time may be pre-set, or may be modified based on an input through the app. The camera may record videos about the operator or a specified location. Prior to the video recording, an indicator light installed on the UAV may indicate to the operator the video recording process using colors or flashes. For example, after the video recording action is triggered, video recording may be performed after 5 seconds. In the first 3 seconds, the indicator light may flash slowly, and in the last 2 seconds, the indicator light may flash quickly. In some embodiments, in the first 3 seconds, a green indicator light may flash, and in the last 2 seconds, a red indicator light may flash. A combination of slow flash, quick flash, and different colors may be used. If the UAV is connected to the app, a voice prompt may be generated on the app.

Step 105: terminating the process.

In some embodiments, according to the technical solutions of the present disclosure, by searching for the arm of the operator and the characteristic point of the arm, a posture of the operator may be determined based on the location relationship between the characteristic point and the operator. The present disclosure provides a new posture recognition method. A control command may correspond to the posture, thereby simplifying the control command of the movable platform. In addition, the methods for controlling the movable platform are also enriched. The posture recognition success rate may be increased.

Figure 7:
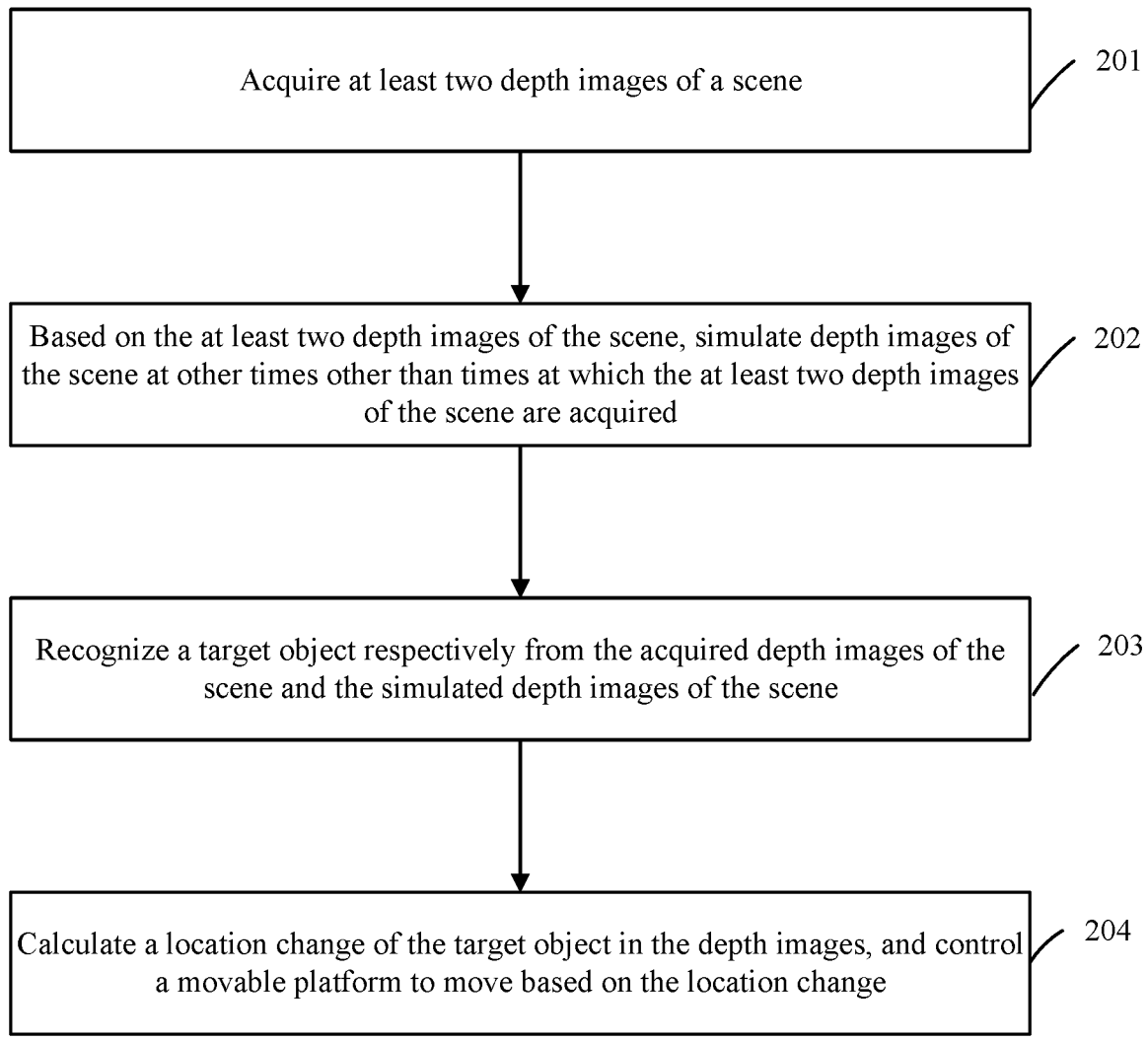
FIG. 7 is a flow chart illustrating a method for controller a movable platform, according to an example embodiment.

FIG. 7 is a flow chart illustrating a method for controlling a movable platform. As shown in FIG. 7, the method may include:

Step 201: acquiring at least two depth images of a scene.

In some embodiments, the entity for performing the method may be a movable platform. The movable platform may include a UAV, an unmanned ground vehicle, a boat, a robot, etc. The present disclosure does not limit the type of movable platform. Below discussions use the UAV as an example. The UAV may acquire the depth images of the scene using an imaging device carried by the UAV. The imaging device may be any suitable depth imaging device. The imaging device may include an active depth imaging device and/or a passive depth imaging device. The active depth imaging device may include a TOF camera, a laser scanner, etc. The passive depth imaging device may include: at least one of monocular camera that can generate a three-dimensional vision based on multiple times of photographing, or a binocular camera, etc. The following descriptions use the TOF camera as an example of the depth image acquisition device. The TOF camera may transmit an electromagnetic signal to the operator, and may receive an electromagnetic signal reflected by the operator. The TOF camera may output a depth image regarding the operator.

In some embodiments, the depth image of the scene may be obtained using the disclosed method. For example, the TOF camera installed on the UAV may acquire a series of depth images. In some embodiments, the TOF camera may obtain a series of depth images of the scene to be measured using a 10 Hz frequency. The series of depth images may be acquired during an acquisition time. Using the above disclosed methods, it may be determined whether the scene includes a target object. If the scene does not include the target object, then other subsequent actions may not be performed, or the UAV may exit the controls and may hoover in the air. In some embodiments, after a predetermined time period has lapsed, it may again detect whether there is a target object in the scene. Recognition of the operator in the depth image may use any of the above disclosed methods.

In some embodiments, the target object may include at least one of: an operator or a characteristic part of the operator.

Step 202: based on the at least two depth images of the scene, simulating depth images of the scene at other times other than times at which the at least two depth images of the scene are acquired.

Figure 8:
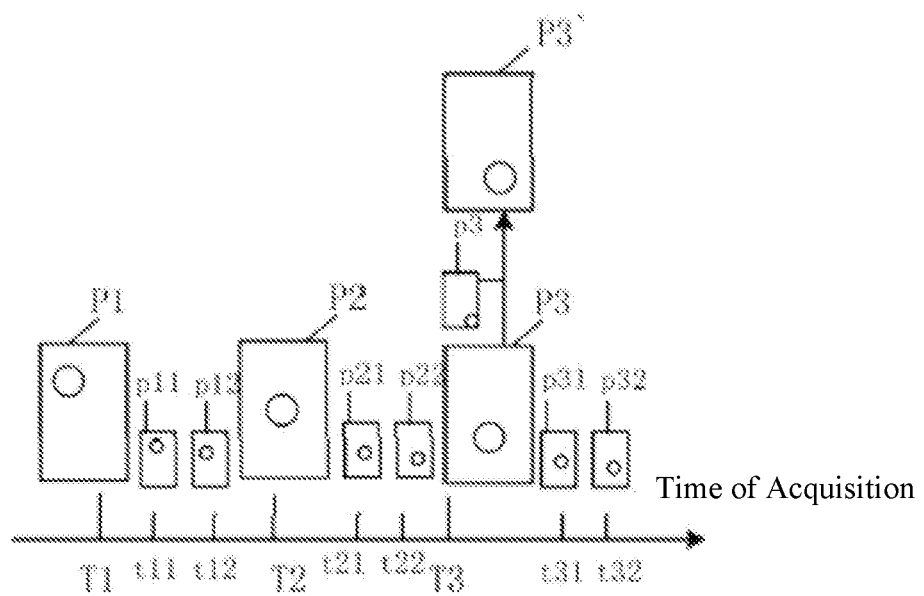
FIG. 8 is a schematic illustration of simulating depth images at other times, according to an example embodiment.

In some embodiments, after acquiring a series of depth images having acquisition times, a depth image of the operator may be obtained from a plurality of depth images of the series of depth images. Simulation may generate a model reflecting changes of each pixel in the image. Based on the model, depths images at other times other than the times at which the plurality of depth images are obtained may be estimated. The other times may be before or after the times at which the plurality of depth images are obtained. The process of simulating depth images at other times is shown in FIG. 8. For example, the acquisition frequency of the TOF camera may be 10 Hz. The depth images may be acquired in the order of T1, T2, T3, . . . . First, a depth image P1 may be acquired at time T1, and then a depth image P2 may be acquired at time T2. A model reflecting the change of the depth images may be established based on these two depth images. In some embodiments, a model reflecting the change of the images may be generated based on the change of states of the UAV and the camera. Various methods may be used to generate the model, including Gaussian mixture model, background modeling, etc. The present disclosure does not limit the methods for generating the model. A model may be estimated to reflect the change of all of the pixels in the image. Depth images p11 at time t11, p12 at time t12, p21 at time t21, p22 at time t22, and p3 at time T3 may be simulated using the model. The simulated depth images may be uniformly distributed at times T1 and T2, just as at times t11 and t12, or may be nonuniformly distributed at times T1 and T2, just as at times t21 and t22. The number of simulated depth images is for example only. Any suitable number may be selected based on actual needs.

Figure 9:
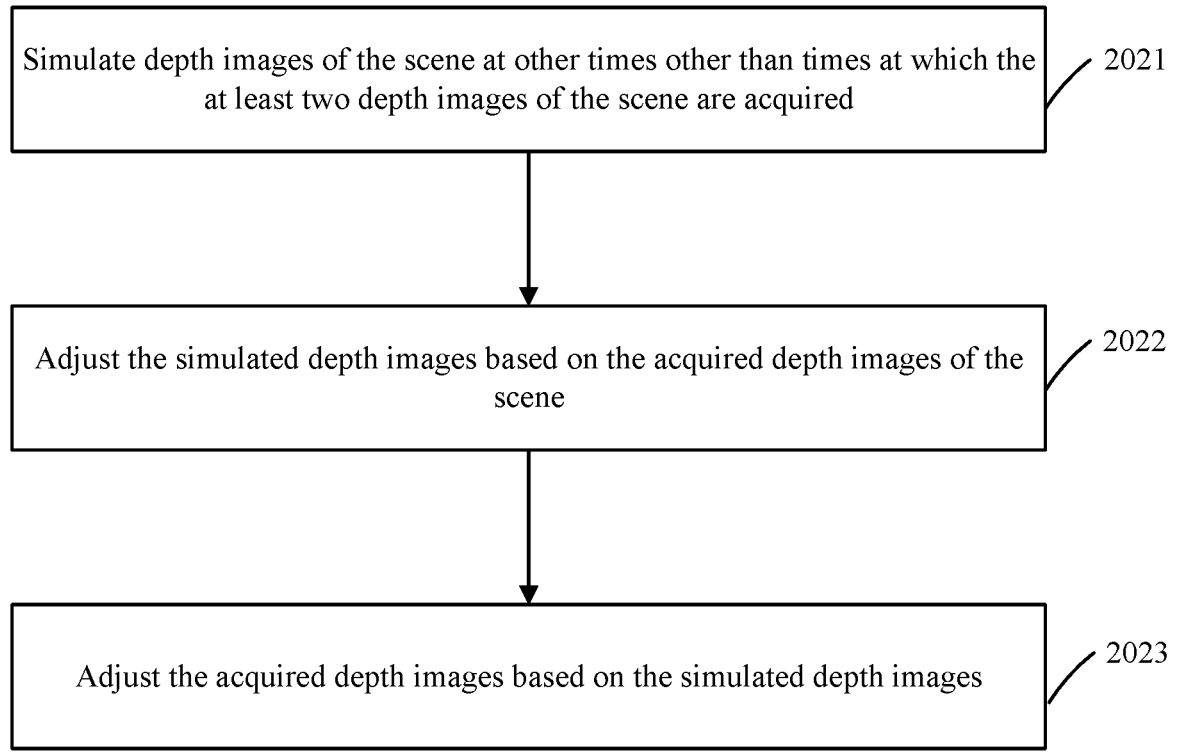
FIG. 9 is a flow chart illustrating a method for controlling a movable platform, according to an example embodiment.

In some embodiments, step 202 may be a control method shown in FIG. 9. The method may include:

Step 2021: simulating depth images of the scene at other times other than times at which the at least two depth images of the scene are acquired;

Step 2022: adjusting the simulated depth images based on the acquired depth images of the scene;

Step 2023: adjusting the acquired depth images based on the simulated depth images.

In some embodiments, as shown in FIG. 8, a model reflecting the change of the images may be established based on two or more acquired depth images. After image p3 at time T3 is estimated using the simulation, if another depth image P3 is acquired at time T3, P3 may be used to replace p3. In some embodiments, more accurate P3 may be obtained using Kalman filter. In other words, the estimated p3 obtained through simulation and the P3 acquired by the TOF camera both have a degree of uncertainty. Different weights may be assigned to the two images based on their respective degrees of certainty. For each pixel, a pixel value closest to the actual value may be calculated to obtain the depth image p3 that is closest to the actual values. Based on this depth image p3, the model reflecting change of images generated based on the depth image P1 acquired at time T1 and the depth image P2 acquired at time T2 may be adjusted. The adjusted model may be used to adjust subsequently simulated depth images, and to adjust simulated depth images p11, p12, p21, and p22 for other times that are generated prior to the adjustment of the model. More accurate depth images p31, p32 may be generated using the adjusted model for subsequent calculations. The depth images may be simulated at a predetermined frequency, such as 50 Hz. The frequency may be adjusted based on actual needs. For example, when more resources are available, more depth images may be simulated. When less resources are available, fewer depth images may be simulated, or simulation of depth images may be terminated. Steps 2022 and 2023 may be executed in any order, which may be adjusted based on actual needs. In some embodiments, only one of steps 2022 and 2023 may be selected for execution.

According to the above technical solutions, an estimated depth image may be obtained through an estimation model. Acquired depth images may be used to adjust the depth images generated through simulation. Depth images generated through simulation may be used to adjust the acquired depth images. As such, the acquired depth images and the simulated depth images become more accurate, closer to the actual values. Thus, the accuracy of analysis of targeted characteristic parts of the operator may be increased.

Step 203: recognizing a target object respectively from the acquired depth images of the scene and the simulated depth images of the scene.

In some embodiments, the target object may include the operator and a characteristic part of the operator.

In some embodiments, point clouds of the operator may be obtained based on the depth images of the scene and the depth images at other times. The operator may be recognized from the point clouds of the operator through a detection algorithm. For example, different parts of the operator may be recognized based on different depths calculated from the depth images. For an operator, each part of the operator may have a different distance to the TOF camera, i.e., different depth. Accordingly, based on different depth information, the body of the operator having depth difference within a predetermined value may be recognized. Other parts of the operator may be similarly recognized, such as the palm, etc.

In some embodiments, a capturing center may be set. Point clouds in a predetermined range adjacent the capturing center may be obtained using regular or irregular images.

The capturing center may be set at the forward direction of the TOF camera. For example, the capturing center may be set at 0.1 m to 20 m in front of the TOF camera. The range may be selected by a person having ordinary skills in the art based on actual needs.

In some embodiments, an external signal may be input. The signal may determine a pixel point on the depth image. The operator may be determined based on detecting other pixels connected with the pixel. For example, when the depth image of the scene includes multiple targets, the input signal may be used to determine which target is the operator.

In some embodiments, template matching may be used. One or more suitable templates may be used to match the depth image. The process of matching may include dividing the depth image into different pieces, and each piece may be matched. In some embodiments, template matching may be applied to the entire depth image.

In some embodiments, the operator may be recognized using a dynamic time warping ("DTW") algorithm.

In some embodiments, machine learning or deep learning algorithms may be used. A neural network may be trained using the existing images, and a training set may be obtained. The acquired depth images may be processed using the neural network to recognize the operator.

In some embodiments, clustering methods may be used to detect the operator. The depth images may be classified into different clusters. Each cluster may be matched to detect the operator. The method of detecting the operator is not limited in the present disclosure.

In some embodiments, the operator may be a human being, or a robot, etc. Human beings are used as example operators in the following descriptions. Each pixel of the depth image may be stored using its coordinates. The location and size of the operator may be stored using the point clouds. During calculation, the coordinates of the depth images in the image coordinate system may be used, or the coordinates in the camera coordinate system may be used. The conversion method may be similar to that of the TOF camera calibration.

In some embodiments, the order of obtaining the operator and the characteristic part of the operator based on the depth image is not limited. In some embodiments, the operator may be first recognized, and then the characteristic part of the operator may be recognized. In some embodiments, the characteristic part of the operator may be recognized first, and then the operator may be recognized.

In some embodiments, the above methods may be used to recognize the operator, the body of the operator, or the characteristic part of the operator. As shown in FIG. 4, the operator or the body of the operator may be identified using a regular or irregular frame. Here a rectangular frame is used as an example. The rectangle may be represented by $(x_b, y_b, w_b, h_b)$, where $(x_b, y_b)$ are the coordinates of the upper left corner point, $w_b$, $h_b$ are the width and height of the rectangle, is the depth of the body. The location of the rectangular frame 99 may be determined based on the location of the operator. The size of the rectangular frame 99 may be determined based on the size of the body, such that the rectangular frame 99 may cover or partially cover the body of the operator. When the depth image includes multiple targets, the rectangular frame 99 may enclose a target based on a predetermined location setting, or based on an external input.

In some embodiments, pixel points connected with the point clouds of the body within a predetermined depth may be obtained using a connected region detection algorithm. The predetermined depth may be pre-set, such as −1 to 1 m. A set including all of the point clouds may be determined as the point clouds of the operator. The location of the operator in the depth image may be determined.

In some embodiments, a received signal may include location information. The location information may include the location information of the point on the depth image of the scene. A set of pixel points connected with the location within a predetermined depth may be determined. The entire set may be determined as the point clouds of the operator. The characteristic part of the operator may include one or more of a hand, a head, a leg, a foot, or any other characteristic object of the operator. The characteristic part may be a finger, two fingers, a fist, etc. The present disclosure does not limit the characteristic part.

In some embodiments, when obtaining the operator and the characteristic part of the operator from each depth image, the acquisition time of the depth image may also be obtained.

Step 204: calculating a location change of the target object in the depth images, and controlling a movable platform to move based on the location change.

In some embodiments, two situations may exist: one is change of the characteristic part, such as one extended finger has become two extended fingers. Another is a movement of the characteristic part, such as a hand of an extended arm moves from in front of the body to the right side of the body.

In some embodiments, for the first situation, the above described methods may be used for calculation, including, for example: clustering, template matching, etc. A set of points of a two-dimensional image of the palm may be obtained based on point clouds indicating the palm of the operator. A gesture may be determined based on a distribution characteristic of the point clouds. Here the gesture of the operator is recognized, including, for example, a fist, an open palm, one finger being extended, two fingers being extended, etc. In some embodiments, a frame of depth image may be obtained and determined. The palm of the operator may be recognized from the frame of depth image using the above-described methods. Because three-dimensional coordinates of each pixel point correspond one by one with two-dimensional coordinates of a point on a two-dimensional image, and because the two types of coordinates may be stored during the gesture recognition process, after the point clouds of the palm of the operator are determined, a set of points of the two-dimensional image of the palm of the operator may be determined. Because different gestures of the operator correspond to different hand types, the distribution characteristics of the point clouds of the two-dimensional image of the palm are different. For example, the distribution characteristics of the first gesture and the distribution characteristics of the open palm are different. As such, the distribution characteristics of the two-dimensional point clouds of the palm may be determined, and the gesture of the operator in the frame of image may be determined based on the distribution characteristics.

In some embodiments, a distribution region of the two-dimensional point clouds of the palm may be determined. Distribution characteristics of the point clouds may be determined based on the distribution region. For example, the palm of the operator may be determined to be represented by a polygon. When a furthest distance corresponding to each side of the polygon is smaller than a predetermined value, it may be determined that there is a first. When the furthest distance corresponding to some sides of the polygon is greater than the predetermined value, it may be determined that the action of the operator is that some fingers are extended. In some embodiments, the gesture of the operator may be determined based on a change in the depth of the pixels in a row or column. For example, when the number of occurrences when the depth change in the pixels of the same row or column exceeds 3, it may be determined that the gesture is that all five fingers are in extended state.

In some embodiments, multiple obtained frames of depth images may include acquired depth images and simulated depth images. A characteristic part of the operator in each depth image may be determined from the multiple depth images. Location information of the characteristic part corresponding to each depth image may be determined based on the point clouds of the characteristic part of the operator corresponding to each frame of depth image. The movement state of the palm may be determined based on a series formed by the location information.

In some embodiments, a speed of the characteristic part at a location corresponding to the location information may be obtained based on the time information and location information. The speed may be obtained based on information of the characteristic part in two adjacent depth images. In some embodiments, the speed may be obtained based on multiple depth images. Here, for illustration purposes, the speed may be calculated through the simplest way, i.e., calculating the ratio between the distance traveled and the time spent. Other suitable methods may also be used to calculate the speed. For example, the current speed may be determined based on the speed at the last time instance and the current information of the characteristic part.

In some embodiments, the locations of the operator and the characteristic part of the operator obtained through calculation may be used to control the movement of the movable platform. The movable platform may include: UAV, unmanned ground vehicle, boat, etc. Here, the UAV is used as an example of the movable platform. The location change of the operator or the characteristic part of the operator in different depth images may be used to control the UAV to move following the location change. In some embodiments, the moving speed of the operator or the characteristic part of the operator may be used to control the moving speed of the UAV. The moving speed of the UAV and the moving speed of the operator or the characteristic part of the operator may change proportionally.

In some embodiments, when the location change of the operator or the characteristic part of the operator, or the speed, exceeds a predetermined value, or when the location change of the operator or the characteristic part of the operator, or the speed, is smaller than the predetermined value, the movable platform may hoover without any movement.

In some embodiments, step 204 may include: controlling the movable platform to move based on the location change. The movable platform and the target object may maintain a first predetermined distance.

In some embodiments, during the movement of the movable platform, the movement of the platform may be controlled based on the location change of the target object and the speed, which are obtained using the above methods. The distance between the target object and the TOF camera may be maintained at a fixed value. In some embodiments, the distance may equal to the sum of the length of the arm of the operator and 0.7 m.

In some embodiments, the movable platform may be controlled based on the location change to maintain the target object to be located at a center region of the depth image of the scene.

In some embodiments, during the movement of the movable platform, the movement of the movable platform may be controlled based on the location change of the target object and the speed, which are determined based on the above methods. The target object may be maintained in a region adjacent the center of the field of view of the TOF camera. The region adjacent the center of the field of view may be preset, or may be input by a user.

According to the technical solutions of the present disclosure, the acquired depth images may be used to simulate depth images, from which a target object may be extracted or recognized for controlling the movement of the movable platform. The present disclosure provides a more accurate method for controlling the movable platform, solving a potential issue associated with the acquisition frequency of some sensors being too low. The disclosed methods reduce the high-frequency vibration in the control process. By processing a relatively large number of frames of images, tracking of the target by the movable platform becomes smoother. The travel path of the characteristic part of the operator may be extracted more accurately, thereby reducing the risk of losing track of the target.

Figure 10:
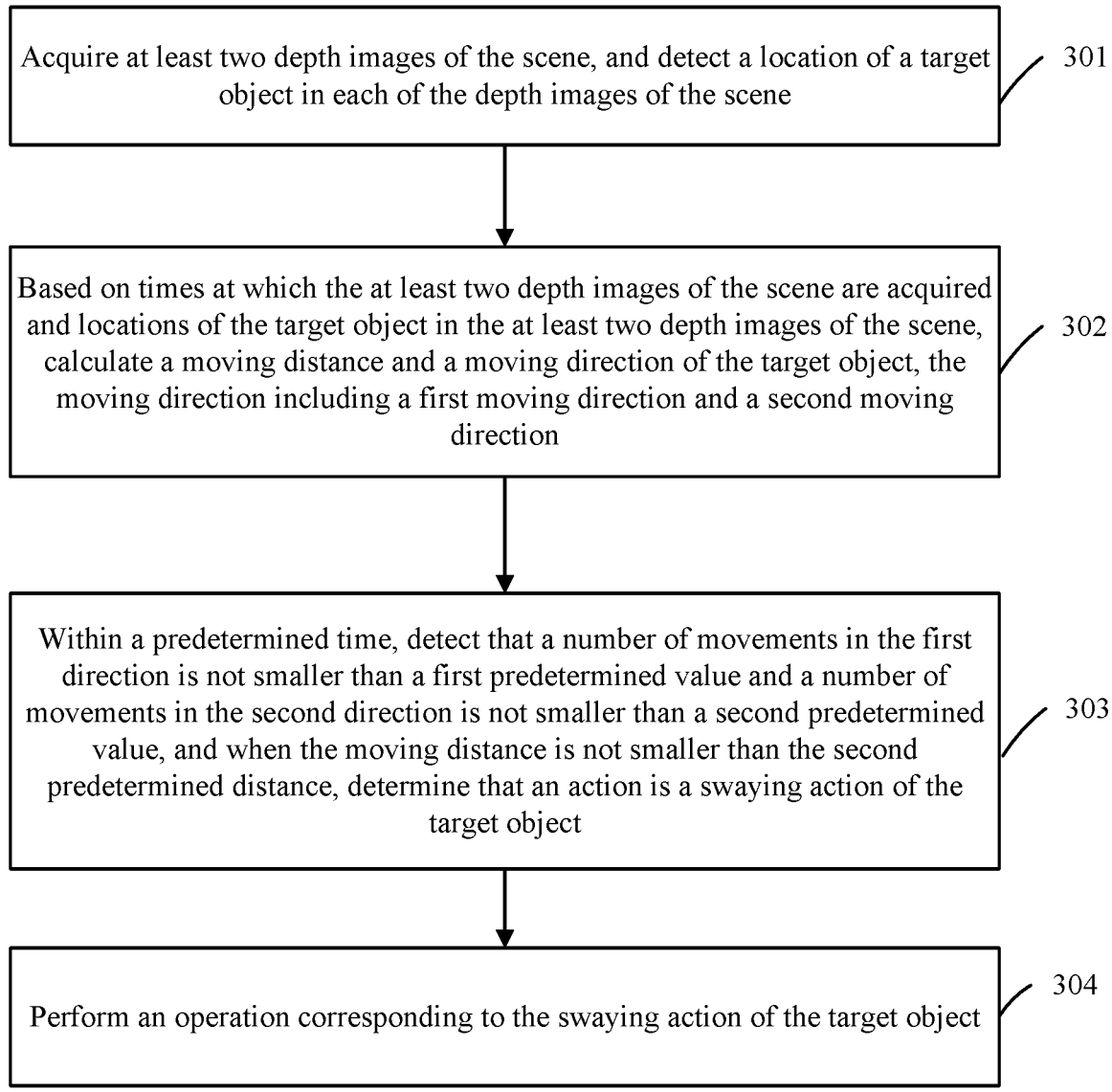
FIG. 10 is a flow chart illustrating a method for recognizing an action, according to an example embodiment.

FIG. 10 is a flow chart illustrating a method for recognizing an action. The method may include:

Step 301: acquiring at least two depth images of the scene, and detecting a location of a target object in each of the depth images of the scene.

In some embodiments, the target object may include the operator and the characteristic part of the operator. The operator may be a human being, or a machine. The characteristic part may be the palm, the head, or the foot, etc. The palm is used as an example of the characteristic part. A hand gesture of the operator may be determined based on multiple depth images. The hand gesture may be a hand gesture formed by the operator moving the palm. To recognize the hand gesture, first, the hand in each depth image may be extracted. According to the methods described above, point clouds of the palm of the operator in each depth image may be obtained from each depth image. Location information of the palm may be calculated based on the point clouds of the palm of the operator corresponding to each depth image. In some embodiments, a location of a geometric center of the point clouds of the palm may be used included in the location information of the palm. In some embodiments, the location information of the palm may include a location of a point having the smallest depth in the point clouds of the palm. A person having ordinary skills in the art may determine the location of the palm based on the point clouds of the palm of the operator. The present disclosure does not limit the method of determining the location of the palm. Details about the methods for acquiring the depth images and detecting a location of the target object can refer to the above descriptions.

In some embodiments, depth images at other times may be simulated for times between two times when the two depth images are acquired, or after the times when the two depth images are acquired. The simulated depth images may be used for subsequent calculation.

Step 302: based on times at which the at least two depth images of the scene are acquired and locations of the target object in the at least two depth images of the scene, calculating a moving distance and a moving direction of the target object, the moving direction including a first moving direction and a second moving direction.

In some embodiments, based on the location of the palm and the acquisition times determined based on multiple depth images of the scene, a moving distance and a moving direction of the palm within a time period determined based on the acquisition times may be calculated. The moving direction may be a specified direction configured for recognizing an action.

In some embodiments, the location of the palm calculated based on continuously acquired multiple depth images may be stored in a sequence P. The length of the sequence P may be L. L may be determined based on the number of acquired depth images, or may be determined based on time. The storage method may use a first in, first out method. The most recently obtained location information of the palm may be used to replace the oldest location information of the palm. The sequence P reflects the moving path of the palm in a fixed time period, i.e., a moving direction of the palm between images. The moving path may represent the hand gesture of the operator. Accordingly, the hand gesture of the operator may be obtained based on the sequence P, i.e., the sequence of the location information of the palm. Further, after obtaining the location information of the palm corresponding to a frame of depth image, the location point indicated by the location information may be used as a capturing center. When determining the location information of the palm corresponding to the next frame of depth image, the capturing center may be used as a center of a sphere. Point clouds of the operator may be obtained within a spherical space based on the center of the sphere and a radius of a predetermined distance. In other words, the hand of the operator may be extracted from within the spherical space. This may increase the recognition speed of the hand. In some embodiments, a Kalman filter algorithm may be used to estimate a model for the movement of the palm. The model may be used to predict a location of the palm in the next frame of depth image. The palm of the operator may be extracted adjacent the predicted location of the palm. The Kalman filter algorithm may be started or turned off.

In some embodiments, depth images for other times other than the times at which the two depth images are acquired may be simulated. Form the simulated depth images, the palm information may be extracted. Location recognition may be performed based on the palm information.

In some embodiments, based on the sequence of the location information of the palm, moving directions of the movement of the palm corresponding to the location information in the sequence may be determined. The hand gesture may be determined based on the sequence formed by the moving directions. In some embodiments, based on location information in length L of the sequence P, a moving direction corresponding to the location information may be calculated. In some embodiments, each moving direction corresponding to the location information in the length L may be determined. In some embodiments, each moving direction corresponding to each of multiple pieces of location information within the length L may be determined. The sequence of the moving directions may represent a moving path of the palm in the air and the change of movement. Thus, the sequence of the moving directions may be used to determine the hand gesture of the operator. In some embodiments, the moving direction corresponding to the location information in the sequence P may be the velocity direction corresponding to the location information, or may be a direction determined based on the velocity direction using a suitable method.

In some embodiments, a ratio of each moving direction in the moving directions may be determined. An action of a moving palm may be determined based on a combination of the ratios. For example, a ratio of each moving direction in the sequence of moving directions may be determined. A ratio sequence formed by ratios may be determined. The hand gesture of the operator may be recognized based on the sequence of the ratios. As such, when the operator makes a hand gesture, no matter where the starting point and the ending point of the palm movement are, the same form of ratio sequence may be obtained, which may be convenient to process. When recognizing the hand gesture, the ratio sequence may be input into a predetermined computation model. The predetermined computation model may recognize the hand gesture of the operator based on the ratio sequence. The predetermined computation model may include a neural network, a classifier, a DTW, etc. Before recognizing the hand gesture, the predetermined computation model may be trained. A large number of ratio sequences corresponding to the hand gesture may be acquired offline. The ratio sequences may be input into the computation model. The hand gesture corresponding to the ratio sequences may be output from the computation model. After training the predetermined computation model, the predetermined computation model may be used to recognize the hand gesture.

In some embodiments, a velocity direction corresponding to location information in the sequence may be determined. An angle between the velocity direction and each of multiple predetermined directions may be determined. A moving direction may be determined based on the angle. For simplicity of discussion, the following explains how to determine a moving direction corresponding to a velocity direction in a velocity direction sequence. The same method may be used to determine the moving directions corresponding to the other velocity directions in the velocity direction sequence. In some embodiments, an angle between the velocity direction and each of multiple predetermined directions may be determined. The moving direction may be determined based on the angle. Because the velocity directions calculated using the above method corresponding to the location information are scattered, for the convenience of subsequent statistical processing, it may be desirable to classify the velocity directions. Velocity directions that have differences within a predetermine range may be classified into a same direction. Multiple predetermined directions may be set, such as Vu, Vp, Vl, Vr, Vf, Vd, which represents up, down, left, right, front, and rear, six predetermined directions. A velocity direction Vi corresponding to a location point may be calculated. A unit vector corresponding to the velocity direction may dot-product a unit vector corresponding to each of the six predetermined directions, to calculate a1-a6. The moving direction of the location information may be determined based on the a1-a6. For example, the ai having the smallest angle may be determined from a1-a6. A first predetermined direction corresponding to ai may be determined as the moving direction corresponding to the location information. The up, down, left, right, front, and rear, six predetermined directions are for illustration only. If the hardware condition permits, a person having ordinary skills in the art may set more predetermined directions, such that the classification of the velocity directions becomes more accurate. As a result, the error in the moving direction corresponding to the location information becomes smaller. In general, the number of predetermined directions may be selected by the person having ordinary skills in the art based on design need and/or hardware condition, which is not limited in the present disclosure.

In some embodiments, a speed corresponding to the location information may be determined based on the sequence of the location information. When the speed is less than a predetermined speed value, it may be determined that the palm is in a static state at a location point indicated by the location information. The speed corresponding to the location information in the sequence P may be determined based on the location information sequence P. The speed may be the speed of the palm at the location point indicated by the location information. The speed may be calculated based on the displacement of the palm. The displacement may be determined based on the location information in the location information sequence. Because the time intervals between two adjacent pieces of location information in the location information sequence are the same, time information may not need to be introduced. The speed corresponding to the location information may be directly represented by the displacement. For example, the speed corresponding to P2 may be represented by the displacement from P1 pointing to P2. The displacement may be obtained based on the location information of P1 and P2. Similarly, the speed corresponding to P3, P4, P5, P6, and P7 may be obtained. When the speed is less than or equal to a predetermined speed value, it may be determined that the palm is in a static state, and there is no moving direction. The speed corresponding to the location information may be calculated using other methods. For example, a moving direction of the palm may be calculated based on every other images or every multiple images. The present disclosure does not limit how the moving direction is calculated.

In some embodiments, in addition to using a classification method or a location path method, the determination may be made based on a moving distance of the palm. For example, after a specified number of photo acquisitions or within a predetermined time period, from just about to move to the right to just about to move to the left, or from just about to move to the left to just about to move to the right, the distances of all of the paths traversed by the palm may be used to determine whether there is a predetermined action. When the distance of one of the paths is greater than a predetermined value, it may be determined that there is a hand swing action. In some embodiments, within a predetermined time period, if a distance between any two points is greater than a second predetermined distance, it may be determined that there is a hand swing action. In some embodiments, the second predetermined distance may be 0.4 m.

In some embodiments, during the above from left to right or from right to left time period, a horizontal projected distance of the travel path of the palm may be compared with the second predetermined distance. In some embodiments, during a predetermined time period, the horizontal projected distance of a distance between any two points may be compared with the second predetermined distance. The comparison may be used to determined whether there is a predetermined action. This may avoid false determination of a large-angle slantly upward movement or a large angle slantly downward movement.

Step 303: within a predetermined time, detecting that a number of movements in the first direction is not smaller than a first predetermined value and a number of movements in the second direction is not smaller than a second predetermined value, and when the moving distance is not smaller than the second predetermined distance, determining that an action is a swaying action of the target object.

In some embodiments, the moving path of the palm may be determined using the above classification method or the location path method. Within the first predetermined time, when detecting the first predetermined value or more left movements and the second predetermined value or more right movements, and the moving distance is greater than the first predetermined distance, then the action may be determined as a swaying action of the target object. The first predetermined time may be set based on actual needs. For example, the first predetermined time may be 1 second. The first predetermined time may be different values for different operators. Detecting the first predetermined value and the second predetermined value may also be set based on actual needs. They may be 3 or less than 3, or they may be 1. The first predetermined distance may be set based on actual needs. The first predetermined distance may be between 0-1 m. In some embodiments, the predetermined distance may be 0.4 m or more. The moving distance may be a distance of the traveling path of the palm, or may be a moving distance along a horizontal direction of the traveling path. When the above conditions are satisfied, it may be determined that the action is a swaying action of the target object. In some embodiments, the left movement may be a movement in the exact left direction, in the left upward direction, in the left downward direction, in the left forward direction, in the left backward direction. The right movement may be a movement in the exact right direction, in right upward direction, in the right downward direction, in the right forward direction, in the right backward direction.

In the method shown in FIG. 10, the method may further include performing an operation corresponding to the swaying action of the target object. In some embodiments, when the recognized action is a swaying action of the target object, subsequent operations may be performed, such as photographing, moving away, moving closer, suspension, etc. In some embodiments, the UAV may move away from the target object in a slantly upward direction, then capture images of the target object. In some embodiments, after capturing images, the UAV may return to the starting point.

In some embodiments, through the images, a moving distance and a moving direction of the characteristic part of the operator may be obtained. Within a predetermined time, when detecting the number of movements in the first direction is not smaller than the first predetermined value and the number of movements in the second direction is not smaller than the second predetermined value, and when the moving distance is not smaller than the second predetermined distance, it may be determined that the action is a swaying action of the target object. The disclosed method optimizes the recognition of the swaying action of the target object. When the swaying action does not satisfy a predetermined standard, the swaying action may still be accurately recognized through the moving distance, thereby increasing the swaying action recognition success rate.

Figure 11:
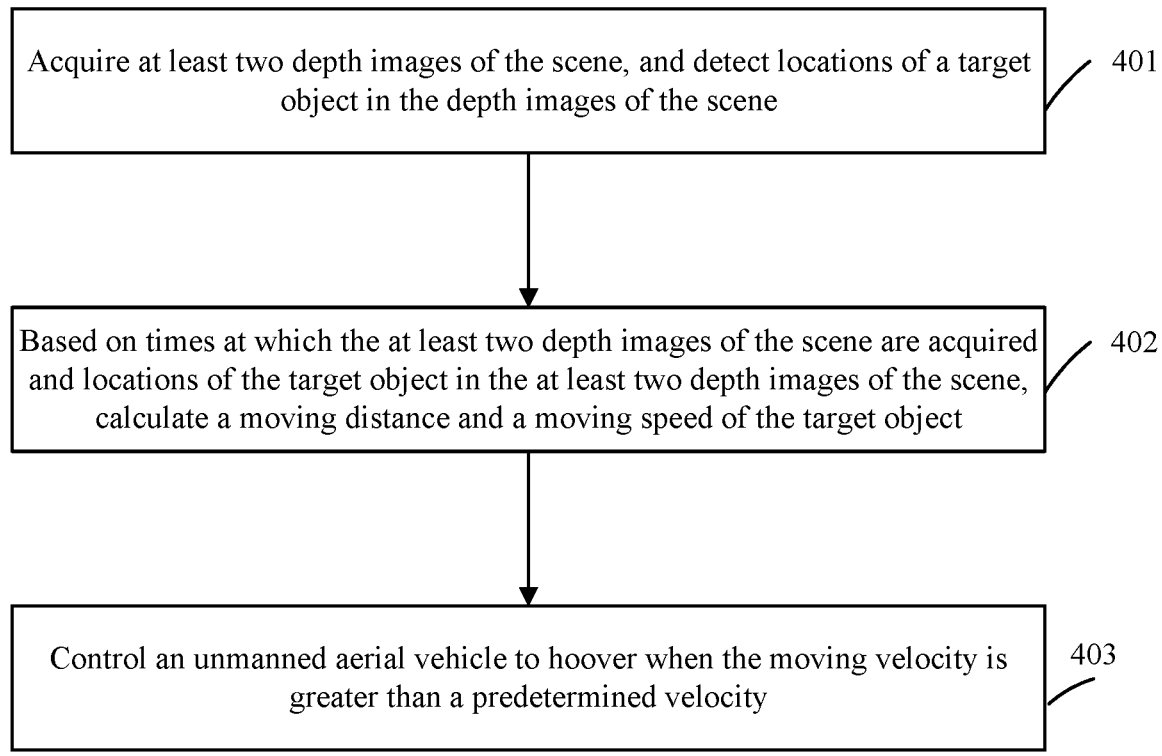
FIG. 11 is a flow chart illustrating a method for controlling a UAV, according to an example embodiment.

FIG. 11 is a flow chart illustrating a method for controlling the UAV. The method may include:

Step 401: acquiring at least two depth images of the scene, and detecting locations of a target object in the depth images of the scene.

In some embodiments, the target object may include the operator and the characteristic part of the operator. The operator may be a human being, or a machine. The characteristic part may be the palm, head, or foot, etc. For example, the characteristic part may be the palm. The hand gesture of the operator may be recognized based on multiple depth images. The hand gesture may refer to the hand gesture formed by moving the palm of the operator. To recognize the hand gesture, first, the palm may be extracted from each of the depth images. Using the above described methods, point clouds of the palm of the operator corresponding to each of the depth images may be obtained from each of the depth images. Location information of the palm may be calculated based on the point clouds of the palm of the operator corresponding to each of the depth images. A location of the geometric center of the point clouds of the palm may be used as the location information of the palm. In some embodiments, a location of a point having the smallest depth information in the point clouds of the palm may be used as the location information of the palm. A person having ordinary skills in the art may use different methods to determine the location information of the palm based on the point clouds of the palm of the operator. The present disclosure does not limit the methods. Methods for acquiring the depth images and detecting the location of the target object may refer to the above descriptions.

In some embodiments, using the above methods, before or after the times when two depth images are acquired, depth images at other times may be simulated. The simulated depth images may be used for subsequent calculations.

Step 402: based on times at which the at least two depth images of the scene are acquired and locations of the target object in the at least two depth images of the scene, calculating a moving distance and a moving velocity of the target object.

In some embodiments, the moving velocity of the palm may be determined based on the location of the palm in at least two depth images of the scene and the times at which the depth images are acquired. When there are more than two images, the calculation may be performed based on two consecutive images, or two non-consecutive images. In some embodiments, the moving velocity of the closest palm may be calculated based on multiple images. The method for calculating the moving velocity may refer to the above-described methods.

In some embodiments, a frequency of acquiring the depth images of the scene may be fixed. As such, when calculating the velocity, the time factor may be neglected. In other words, the time associated with the fixed frequency may be used as a unit time, and only the change in the location of the palm is considered to determine the moving velocity of the palm.

Step 403: controlling an unmanned aerial vehicle to hoover when the moving velocity is greater than a predetermined velocity.

In some embodiments, when the moving velocity is greater than a predetermined speed, the UAV may be controlled to be in a hoovering state. In some embodiments, when a component of the moving velocity along the gravity direction is greater than the predetermined velocity, the UAV may be controlled to hoover. In some embodiments, the predetermined velocity may be greater than 0.5 m/s.

In some embodiments, by calculating the moving velocity of the characteristic part, when the moving velocity of the characteristic part is greater than the predetermined velocity, the UAV may be controlled to hoover. In some embodiments, when the component of the moving velocity in the gravity direction is greater than the predetermined velocity, the UAV may be controlled to hoover. When the operator performs certain operations, such operations may be incorrectly recognized as other operations. By setting the maximum predetermined velocity, the incorrect recognition may be avoided, thereby increasing the recognition accuracy. For example, when the operator exits the posture control state and lower down the characteristic part, hoovering of the UAV may be triggered. This protects the safety of the operator and improves the user experience of the operator.

In some embodiments, the present disclosure provides a computer-readable storage medium. The computer-readable storage medium may be configured to store computer program codes or instructions. The computer codes may be executed to perform the disclosed methods.

Figure 12:
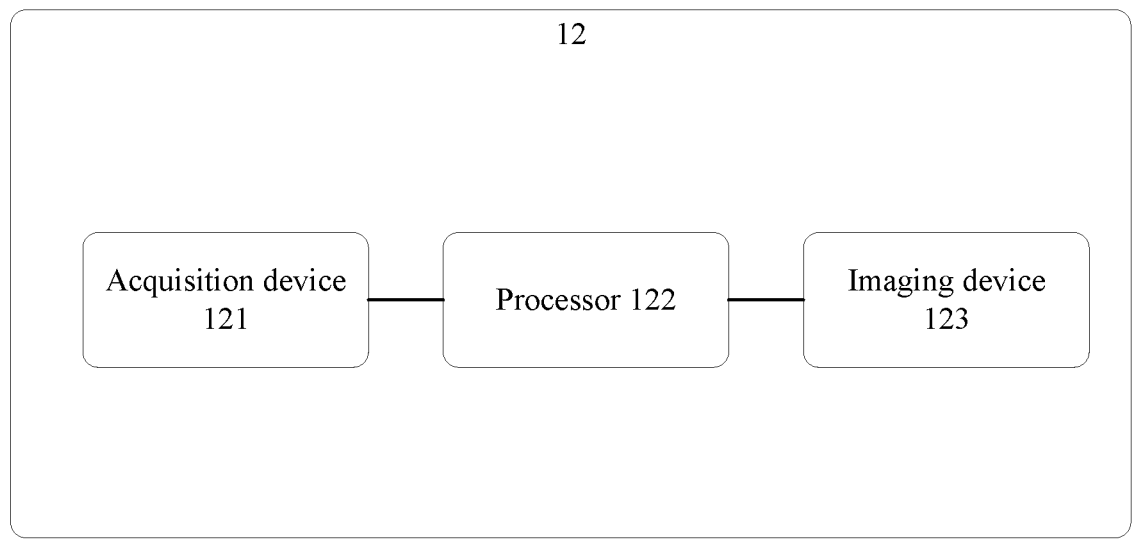
FIG. 12 is a schematic diagram of a structure of a device for recognizing an action, according to an example embodiment.

As shown in FIG. 12, the present disclosure provides a device for recognizing a posture. The device 12 may include an acquisition device 121 and a processor 122.

The acquisition device 121 may be configured to acquire depth images of the scene.

The processor 122 may be configured to obtain point clouds of the operator based on the depth images of the scene, separate the point clouds of the arm from the point clouds of the operator, and obtain the characteristic point from the point clouds of the arm. The processor 122 may also be configured to determine a location relationship between the characteristic point and the operator, and determine a posture of the operator based on the location relationship.

In some embodiments, the processor 122 may be configured to determine, based on a detection algorithm, whether the depth image of the scene includes a target object. If the depth image of the scene includes the target object, the processor 122 may obtain the point clouds of the operator based on the detection algorithm.

In some embodiments, the processor 122 may be configured to determine, based on the detection algorithm, point clouds of the body of the operator from the depth image of the scene. A set formed by the point clouds of the body and point clouds connected with the point clouds of the body may be determined as the point clouds of the operator.

In some embodiments, the processor 122 may be configured to separate point clouds of the body from the point clouds of the operator, the remaining point clouds being the point clouds of the arm.

In some embodiments, the processor 122 may be configured to identify the point clouds of the body using a frame. Point clouds of the operator located outside of the frame may be determined as the point clouds of the arm.

In some embodiments, the processor 122 may be configured to calculate a location of the frame based on a location of the point clouds of the body, and calculate a size of the frame based on a range of the point clouds of the body. The processor 122 may be configured to determine the frame based on the location and size of the frame.

In some embodiments, the processor 122 may be configured to receive a signal. The signal may include location information. The processor 122 may be configured to determine, based on the location information, a set of point clouds connected with the location indicated by the location information as the point clouds of the operator.

In some embodiments, the processor 122 may be configured to obtain a characteristic point from the point clouds of the arm when a number of the point clouds of the arm in the depth image of the scene is within a predetermined number.

In some embodiments, the processor 122 may be configured to determine a calibration point based on the point clouds of the operator. The calibration point may include at least one of: an edge pixel of the point clouds of the operator, or an average value of the point clouds of the operator.

In some embodiments, the processor 122 may be configured to determine the characteristic point by calculating a block distance between each pixel point of the point clouds of the arm and the calibration point. The characteristic point may include at least one of: a characteristic point of an elbow, a characteristic point of a wrist, a characteristic point of a palm, or a characteristic point of an arm.

In some embodiments, the processor 122 may be configured to determine a posture of the operator as a predetermined posture when a depth difference between the characteristic point and the calibration point is within a first range.

In some embodiments, the processor 122 may be configured to determine the posture of the operator as the predetermined posture when a depth difference along the gravity direction between the characteristic point and the calibration point is within a second range.

In some embodiments, the processor 122 may be configured to determine the posture of the operator as the predetermined posture when a distance between the characteristic point and the calibration point is within a third range. The distance may include at least one of a Euclidean di stance or a Mahalanobis distance.

In some embodiments, the device may also include an imaging device 123, such as a camera 123.

The camera 123 may be configured to perform photographing when the predetermined posture is a photographing posture.

In some embodiments, the camera 123 may be configured to perform video recording when the predetermined posture is a video recording posture.

In some embodiments, the processor 122 may include an image processor configured to process the depth images and to determine the posture.

The operations of the posture recognition device 12 may refer to the descriptions of the posture recognition methods.

Figure 13:
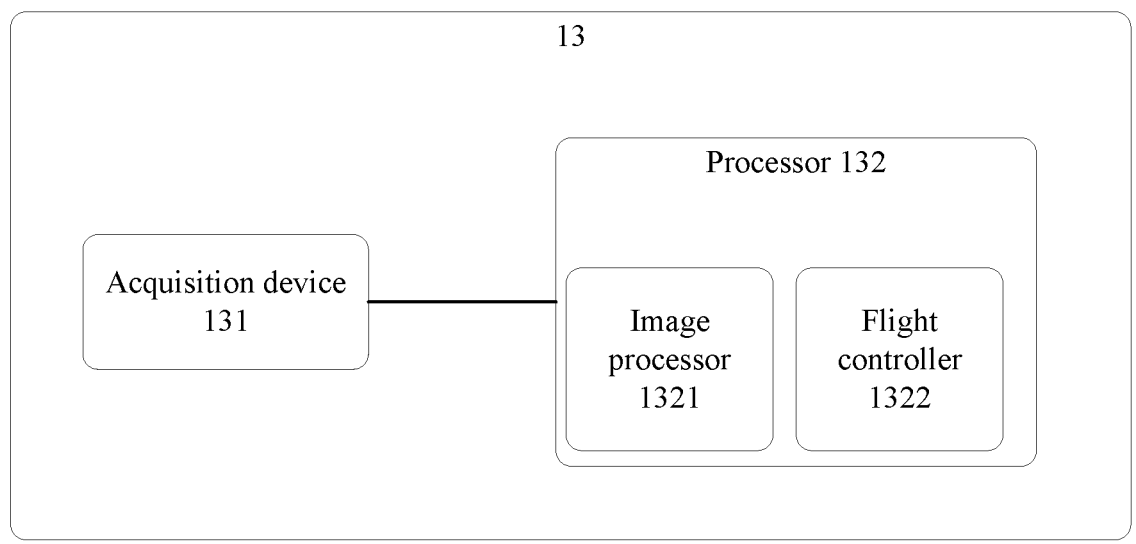
FIG. 13 is a schematic diagram of a structure of a device for controlling a movable platform, according to an example embodiment.

FIG. 13 shows a device 13 for controlling the movable platform. The device 13 may include an acquisition device 131 and a processor 132.

The acquisition device 131 may be configured to acquire depth images of the scene.

The processor 132 may include an image processor 1321 and a flight controller 1322.

The image processor 1321 may be configured to simulate, based on at least two depth images of the scene, depth images of the scene at times other than times at which the at least two depth images are acquired; recognize a target object from the acquired depth images of the scene and the simulated depth images of the scene, respectively; calculate a location change of the target object in the depth images.

The flight controller 1322 may be configured to control the movable platform to move based on the location change.

In some embodiments, the target object may include at least one of: the operator or the characteristic part of the operator.

In some embodiments, the processor 132 may be configured to recognize the operator from the acquired depth images and the simulated depth images using a detection algorithm, respectively.

In some embodiments, the processor 132 may be configured to determine the characteristic part of the operator based on the operator. The characteristic part may include at least one of: a palm, a wrist, an elbow, a leg, a foot, or a head.

In some embodiments, the processor 132 may be configured to recognize the characteristic part from the acquired depth images and the simulated depth images based on a detection algorithm, respectively.

In some embodiments, the processor 132 may be configured to recognize the operator by detecting parts that are connected with the characteristic part. The characteristic part may include at least one of a palm, a wrist, an elbow, a leg, a foot, or a head.

In some embodiments, the processor 132 may be configured to determine, based on the detection algorithm, whether a depth image of the scene include a target object. When the depth image of the scene includes the target object, based on at least two depth images of the scene, the processor 132 may simulate depth images of the scene at times other than the times at which the at least two depth images are acquired.

In some embodiments, the processor 132 may be configured to recognize the target object from the acquired depth images and the simulated depth images, respectively. Time information of the target object may also be obtained.

In some embodiments, the processor 132 may be configured to detect at least two pairs of target objects and time information. Based on the at least two pairs of detected target objects and time information, the processor 132 may calculate a location change and a moving velocity of the target object in the depth image, and control the movable platform to move based on the location change and the moving velocity.

In some embodiments, the processor 132 may be configured to control the movable platform to move based on the location change, to maintain a first predetermined distance with the target object.

In some embodiments, the processor 132 may be configured to control the movable platform to move based on the location change, to maintain the target object being located in a center region of the depth image of the scene.

In some embodiments, the processor 132 may be configured to adjust the simulated depth image based on the acquired depth image of the scene.

In some embodiments, the processor 132 may be configured to adjust the acquired depth image based on the simulated depth image.

The device 13 for recognizing the posture may perform the disclosed methods. The operations of the device 13 may refer to the descriptions of the disclosed methods.

Figure 14:
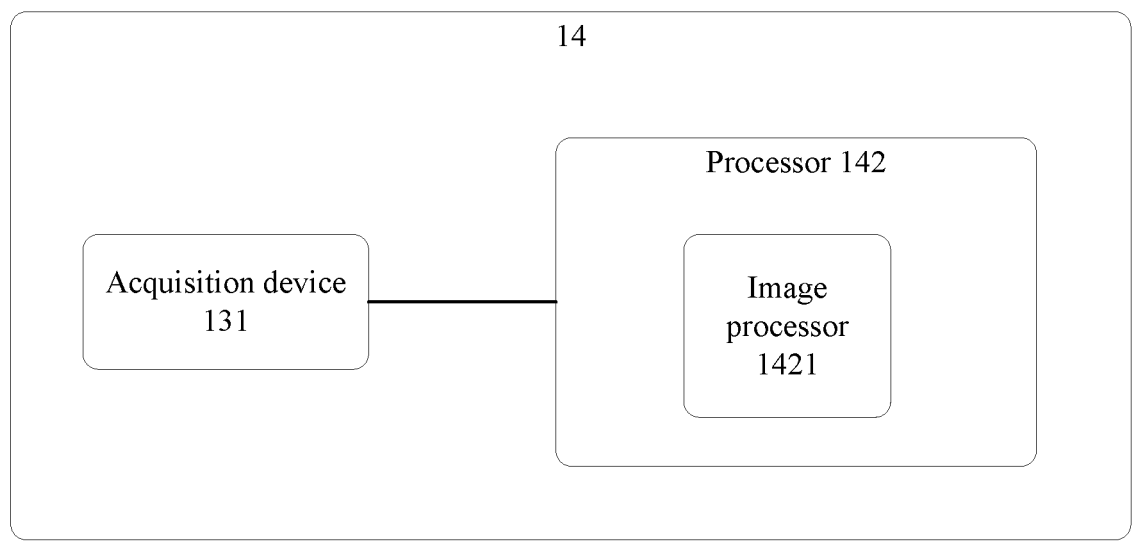
FIG. 14 is a schematic diagram of a structure of a device for recognizing an action, according to an example embodiment.

FIG. 14 shows a device for recognizing an action. The device 14 may include an acquisition device 141 and a processor 142.

The acquisition device 141 may be configured to acquire the depth images of the scene.

The processor 142 may be configured to detect a location of a target object in each of the depth images of the scene; calculate a moving distance and moving direction of the target object based on a time at which the depth image of the scene is obtained and a location of the target object in the depth image of the scene. The moving direction may include: a first moving direction and a second moving direction. In a predetermined time, if the processor 142 detects a number of movements in the first moving direction is not smaller than a first predetermined value, and a number of movements in the second moving direction is not smaller than a second predetermined value, and the moving distance is not smaller than a second predetermined distance, the processor 142 may determine that an action of the target object is a swaying action.

In some embodiments, the processor 142 may include an image processor 1421 configured to detect a location of the target object in each of the depth images of the scene; and to calculate a moving distance of the target object and a moving direction based on a time at which the depth image of the scene is acquired and a location of the target object in the depth image of the scene. The moving direction may include a first moving direction and a second moving direction.

In some embodiments, the processor 142 may be configured to calculate a difference between the locations of the target object in any two depth images of the scene to obtain a distance of the target object. The processor 142 may obtain a moving direction of the target object based on times at which the depth images are acquired and the locations of the target object.

In some embodiments, the processor 142 may be configured to determine a horizontal distance between multiple locations of the target objects in the depth image as the moving distance.

In some embodiments, the first moving direction may include: a moving direction having an angle with a U axis of the image coordinate system of the depth image of the scene, where the angle is within a first predetermined angle range.

In some embodiments, the second moving direction may include: a moving direction having an angle with a reverse U axis of the image coordinate system of the depth image of the scene, where the angel is within a second predetermined angle range.

In some embodiments, the processor 142 may be configured to execute the operations corresponding to the swaying action of the target object.

In some embodiments, the target object may include: the operator or a characteristic part of the operator.

In some embodiments, the device 14 for recognizing the posture may perform the disclosed methods. Operations of the device 14 may refer to the descriptions of the related methods.

Figure 15:
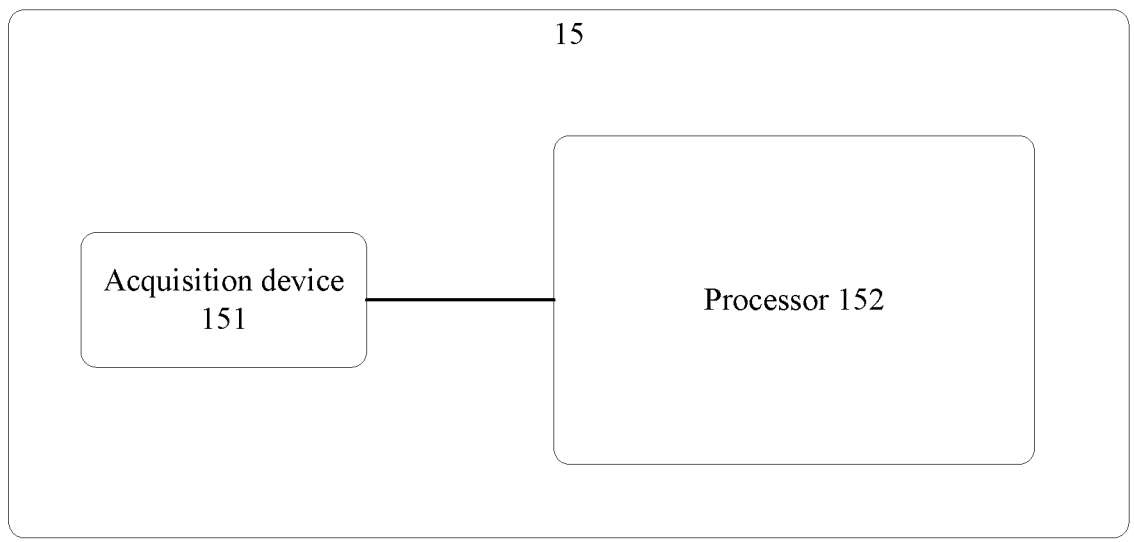
FIG. 15 is a schematic diagram of a structure of a device for controlling a UAV, according to an example embodiment.

FIG. 15 shows a device for controlling a UAV. Device 15 may include an acquisition device 151 and a processor 152.

The acquisition device 151 may be configured to acquire depth images of the scene.

The processor 152 may be configured to detect a location of the target object in the depth image of the scene; calculate a moving velocity of the target object based on a time at which the depth image of the scene is acquired and a location of the target object in the depth image of the scene; and control the UAV to hoover when the moving velocity is greater than a predetermined velocity.

In some embodiments, the processor 152 may be configured to determine the moving velocity of the target object based on a ratio between a difference in locations of the target object in any two depth images of the scene and a difference in times at which the two depth images are acquired.

In some embodiments, the processor 152 may be configured to control the UAV to hoover when a component of the moving velocity in the gravity direction is greater than the predetermined velocity.

In some embodiments, the target object may include: the operator or the characteristic part of the operator.

In some embodiments, the processor 152 may include at least one of an image processor or a flight controller. The image processor may be configured to process the acquired depth images, and to make determinations regarding the posture. The flight controller may be configured to control the movement of the UAV based on a command transmitted by the image processor.

In some embodiments, the device 15 for recognizing the posture may perform the disclosed methods. Operations of the device 15 may refer to the descriptions of the related methods.

Figure 16:
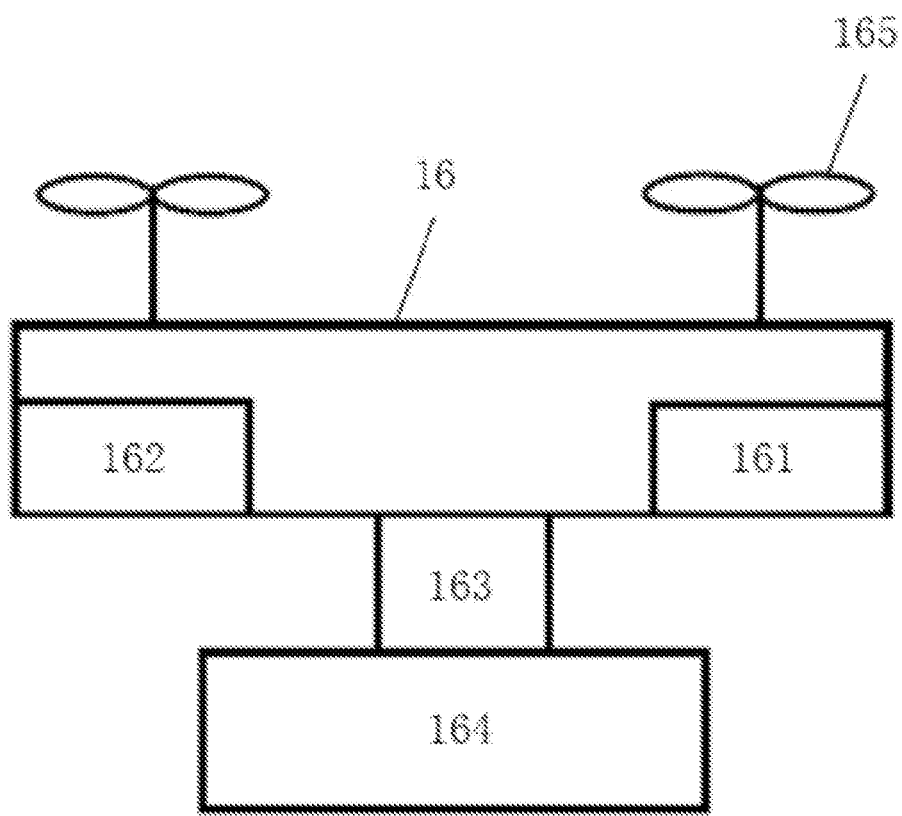
FIG. 16 is a schematic diagram of a structure of a movable platform, according to an example embodiment.

FIG. 16 shows a movable platform 16, which may include a first device 161, a processor 162, a gimbal 163, an imaging device 164, and a propulsion device 165.

The propulsion device 165 may be configured to provide a propulsion force to drive the movable platform 16 to move.

In some embodiments, the processor 162 may be configured to generate a control command corresponding to a recognized posture of the operator, and to control the movable platform based on the control command.

In some embodiments, the first device 161 may include the device 12 configured to recognize the posture of the operator.

In some embodiments, the first device 161 may include the device 13 configured to control the movement of the movable platform.

In some embodiments, the first device 161 may include the device 14 configured to determine the swaying action of the target object.

In some embodiments, the first device 161 may include the device 15, configured to control the UAV to hoover.

In some embodiments, the movable platform 16 may include a UAV, a ground-based robot, a remote control ground vehicle, etc. As shown in FIG. 16, the movable platform 16 may be a UAV. The UAV is used as an example of the movable platform 16 in the following descriptions. The UAV mentioned in the following descriptions may be replaced with the movable platform 16. The first device 161 may be installed or mounted at a suitable location of the UAV. For example, the first device 161 may be the device 12 shown in FIG. 12, the device 13 shown in FIG. 13, the device 14 shown in FIG. 14, the device 15 shown in FIG. 15. The first device 161 may be carried external to the body of the UAV, or may be disposed inside the body of the UAV, which is not limited in the present disclosure. For example, the first device 161 may be mounted at the head portion of the UAV. The first device 161 may be configured to detect objects within a detection range, to capture a palm of the operator, to recognize a hand gesture of the operator, where each hand gesture may correspond to a different control command. The processor 162 may be a flight controller. The processor 162 may control the UAV based on the control command. The method of controlling the UAV to move may include controlling the propulsion device 165 of the UAV. The UAV may include any suitable number of propulsion devices 165. The propulsion device 165 may include, but not be limited to, a propeller including a motor, a propeller including a gas engine, etc. The processor 162 may or may not be included in the UAV. In some embodiments, the first device 161 may perform the functions of the processor 162. The UAV may include the gimbal 163 and the imaging device 164. The imaging device 164 may be carried by the body of the UAV through the gimbal 163. The imaging device 164 may be configured to perform photographing or video recording during the flight of the UAV. The imaging device 164 may include, but not be limited to, multispectral imager, hyperspectral imager, visible light camera, or infrared camera, etc. The gimbal 163 may be a multi-axis transmission and stability-enhancing system. A motor of the gimbal 163 may compensate for an imaging angle of the imaging device 164 by adjusting a rotation angle of a rotation axis. The motor of the gimbal 163 may eliminate or reduce the vibration of the imaging device 164 by providing a suitable damper or buffering mechanism. For convenience of discussion, the hand gesture from which the control command is generated may be referred as a command hand gesture.

In some embodiments, the movable platform may recognize the hand gesture of the operator, and generate a corresponding control command based on the hand gesture of the operator, thereby realizing control of the movable platform. The operator may control the movable platform based on the hand gesture. The disclosed methods enrich the methods for controlling the movable platform, reduce the professional requirements on the operator, and improving the interestingness of operating the movable platform.

It should be understood that in the present disclosure, relational terms such as first and second, etc., are only used to distinguish an entity or operation from another entity or operation, and do not necessarily imply that there is an actual relationship or order between the entities or operations. The terms "comprising," "including," or any other variations are intended to encompass non-exclusive inclusion, such that a process, a method, an apparatus, or a device having a plurality of listed items not only includes these items, but also includes other items that are not listed, or includes items inherent in the process, method, apparatus, or device. Without further limitations, an item modified by a term "comprising a . . . " does not exclude inclusion of another same item in the process, method, apparatus, or device that includes the item.

In the present disclosure, the term "computer-readable storage medium" refers to a non-transitory storage device that may include, store, communicate, broadcast, or transmit computer program. The storage medium or storage device may include a volatile memory, such as a random access memory ("RAM"). The storage medium may also include a non-volatile memory, such as a flash memory, a hard disk drive, or a solid-state drive, etc.

The processor may be a central processing unit ("CPU"). The processor may include other hardware chips, such as an application-specific integrated circuit ("ASIC"), a programmable logic device ("PLD"), or a combination thereof. The PLD may be a complex programmable logic device ("CPLD"), a field-programmable gate array ("FPGA"), etc.

When describing the various embodiments, the descriptions follow a progressive approach. The description of an embodiment may be based on the difference between the embodiment and previously described embodiments. Therefore, similar features and parts included in the embodiment may have already been described in one or more previously described embodiments. For a device that implements the disclosed methods, because the descriptions of the functions of the device are similar to the descriptions of the corresponding methods, the descriptions of the functions are simplified or omitted. Thus, for descriptions of the functions of the device, one can refer to the descriptions of the corresponding methods.

A person having ordinary skill in the art can appreciate that part or all of the above disclosed methods and processes may be implemented using related electrical hardware, or a combination of electrical hardware and computer software that may control the electrical hardware. To illustrate the exchangeability of the hardware and software, in the above descriptions, the configurations and steps of the various embodiments have been explained based on the functions performed by the hardware and/or software. Whether the implementation of the functions is through hardware or software is to be determined based on specific application and design constraints. A person of ordinary skill in the art may use different methods to implement the functions for different applications. Such implementations do not fall outside of the scope of the present disclosure.

The disclosed functions, methods, and algorithms may be realized using hardware, software functioning units executable by processors, or a combination thereof. The software functioning units may be stored in a computer-readable medium as instructions or codes, such as a non-transitory computer-readable storage medium. In some embodiments, the software functioning units may be stored in a random access memory ("RAM"), a read-only memory ("ROM"), an Electrically Programmable read only memory ("EPROM"), an Electrically Erasable Programmable read only memory ("EEPROM"), a register, a hard disk, a movable magnetic disc, a Compact Disc-ROM, or any other types of storage media.

The above descriptions explain in detail the various embodiments of the disclosed methods. The above descriptions use detailed examples to explain the principle and implementation of the disclosed methods. These explanations of the various embodiments are intended to facilitate the understanding of the disclosed methods and the ideas. A person having ordinary skills in the art may modify the detailed implementation and the application scope based on the present disclosure. Thus, the content of the present specification should not be interpreted as being limiting the scope of the present disclosure.

Other embodiments of the present disclosure will be apparent to those skilled in the art from consideration of the specification and practice of the embodiments disclosed herein. It is intended that the specification and examples be considered as example only and not to limit the scope of the present disclosure, with a true scope and spirit of the invention being indicated by the following claims. Variations or equivalents derived from the disclosed embodiments also fall within the scope of the present disclosure.

What is claimed is:

1. A method for recognizing a posture, comprising:
   acquiring a depth image of a scene, and obtaining point clouds of an operator based on the depth image of the scene;
   separating point clouds of an arm from point clouds of a remaining part of the operator and obtaining a characteristic point from the point clouds of the arm, the remaining part being a part of the operator other than the arm; and
   determining a location relationship between the characteristic point and a point in the point clouds of the remaining part of the operator and determining a posture of the operator based on the location relationship.

2. The method of claim 1, wherein obtaining the point clouds of the operator based on the depth image of the scene comprises:
   determining, based on a detection algorithm, whether a target object is included in the depth image of the scene; and
   determining, based on the detection algorithm, the point clouds of the operator based on determining that the target object is included in the depth image of the scene.

3. The method of claim 1, wherein obtaining the point clouds of the operator based on the depth image of the scene comprises:
   determining, based on a detection algorithm, point clouds of a body of the operator from the depth image of the scene; and
   determining a set including the point clouds of the body and point clouds connected with the point clouds of the body as the point clouds of the operator.

4. The method of claim 3, wherein separating the point clouds of the arm from the point clouds of the remaining part of the operator comprises:
   separating the point clouds of the body from the point clouds of the operator, remaining point clouds being the point clouds of the arm.

5. The method of claim 4, wherein separating the point clouds of the arm from the point clouds of the remaining part of the operator comprises:
   calculating a location of a frame based on a location of the point clouds of the body, and calculating a size of the frame based on a range of the point clouds of the body;

determining the frame based on the location of the frame and the size of the frame;

identifying the point clouds of the body using the frame; and determining the point clouds of the operator located outside of the frame as the point clouds of the arm.

6. The method of claim 1, wherein obtaining the point clouds of the operator based on the depth image of the scene comprises:

receiving a signal, the signal comprises location information; and determining, based on the location information, a set including point clouds connected with a location indicated by the location information as the point clouds of the operator.

7. The method of claim 1, wherein after separating the point clouds of the arm from the point clouds of the remaining part of the operator, the method further comprises:

obtaining the characteristic point from the point clouds of the arm when a number of the point clouds of the arm in the depth image of the scene is within a predetermined number.

8. The method of claim 1, wherein obtaining the characteristic point based on the point clouds of the arm comprises:

determining a calibration point based on the point clouds of the operator, the calibration point comprising at least one of an edge pixel of the point clouds of the operator or an average value of the point clouds of the operator; and determining the characteristic point based on a block distance calculated between each of the point clouds of the arm and the calibration point, wherein the characteristic point comprises at least one of a characteristic point on an elbow, a characteristic point on a wrist, a characteristic point on a palm, or a characteristic point on an arm.

9. The method of claim 8, wherein determining the location relationship between the characteristic point and the operator and determining the posture of the operator based on the location relationship comprises at least one of:

determining the posture of the operator as a first predetermined posture based on a determination that a depth difference between the characteristic point and the calibration point is within a first range; or determining the posture of the operator as a second predetermined posture based on a determination that a depth difference between the characteristic point and the calibration point in a gravity direction is within a second range.

10. The method of claim 1, wherein determining the location relationship between the characteristic point and the point in the point clouds of the remaining part of the operator and determining the posture of the operator based on the location relationship includes at least one of:

determining the posture of the operator as a first predetermined posture based on a determination that a depth difference between the characteristic point and the point in the point clouds of the remaining part of the operator is within a first range; or determining the posture of the operator as a second predetermined posture based on a determination that a depth difference between the characteristic point and the point in the point clouds of the remaining part of the operator in a gravity direction is within a second range.

11. A method for controlling a movable platform, comprising:

acquiring at least two depth images of a scene;

simulating, based on the at least two depth images of the scene, depth images of the scene at times other than times at which the at least two depth images of the scene are acquired;

recognizing a target object from the acquired depth images of the scene and the simulated depth images of the scene; and calculating a location change of the target object in the at least two acquired depth images and the simulated depth images, and controlling the movable platform to move based on the location change.

12. The method of claim 11, wherein the target object comprises at least one of an operator or a characteristic part of the operator.

13. The method of claim 12, wherein:

recognizing the target object from the acquired depth images of the scene and the simulated depth images of the scene comprises:

recognizing the operator and the characteristic part of the operator from the acquired depth images of the scene and the simulated depth images of the scene, comprising at least one of:

recognizing, based on a first detection algorithm, the operator from the acquired depth images and the simulated depth images, and determining the characteristic part of the operator based on the operator; or recognizing, based on a second detection algorithm, the characteristic part from the acquired depth images and the simulated depth images, and detecting parts connected to the characteristic part of the operator to determine the operator; and the characteristic part comprises at least one of a palm, a wrist, an elbow, a leg, a foot, or a head.

14. The method of claim 11, wherein simulating, based on the at least two depth images of the scene, depth images of the scene at times other than times at which the at least two depth images of the scene are acquired comprises:

determining, based on a detection algorithm, whether the at least two depth images of the scene include the target object, and when the at least two depth images of the scene include the target object, simulating, based on the at least two depth images of the scene, depth images of the scene at times other than times at which the at least two depth images of the scene are acquired.

15. The method of claim 11, wherein recognizing the target object from the acquired depth images of the scene and the simulated depth images of the scene, and calculating the location change of the target object in the at least two acquired depth images and the simulated depth images, and controlling the movable platform to move based on the location change comprises:

recognizing the target object from the acquired depth images of the scene and the simulated depth images of the scene, and obtaining time information of the target object; and calculating the location change of the target object in the acquired depth images and the simulated depth images and a moving velocity of the target object based on detecting at least two pairs of recognized target objects and the time information, and controlling the movable platform to move based on the location change and the moving velocity.

16. The method of claim 11, wherein calculating the location change of the target object in the at least two acquired depth images and the simulated depth images, and controlling the movable platform to move based on the location change includes:

calculating a moving velocity of the target object based on the at least two acquired depth images and the simulated depth images; and controlling the movable platform to hover in response to the moving velocity of the target object being greater than a predetermined velocity.

17. The method of claim 11, wherein simulating, based on the at least two depth images of the scene, the depth images of the scene at the times other than the times at which the at least two depth images of the scene are acquired includes at least one of:

adjusting the simulated depth images based on the acquired depth images of the scene; or adjusting the acquired depth images based on the simulated depth images.

18. A method for recognizing an action, comprising:

acquiring at least two depth images of a scene, and detecting locations of a target object in each of the depth images of the scene;

calculating a moving distance and a moving direction of the target object based on times at which the depth images of the scene are acquired and the locations of the target object in the depth images, the moving direction comprising a first direction and a second direction; and determining an action of the target object is a swaying action based on a detection, within a predetermined time, that a number of movements in the first moving direction is not smaller than a first predetermined value, a number of movements in the second direction is not smaller than a second predetermined value, and the moving distance is not smaller than a predetermined distance.

19. The method of claim 18, wherein calculating the moving distance and the moving direction of the target object comprises:

obtaining a distance for the target object based on a difference between the locations of the target object in two depth images of the at least two depth images, and obtaining the moving direction based on the times at which the two depth images are acquired and the locations of the target object.

20. The method of claim 18, wherein the moving distance comprises a horizontal distance between the locations of the target object in two depth images of the at least two depth images.

* * * * *